(12) United States Patent
Sakamoto et al.

(10) Patent No.: US 11,976,199 B2
(45) Date of Patent: May 7, 2024

(54) HALOGENATED ZINC PHTHALOCYANINE PIGMENT FOR COLOR FILTER AND METHOD FOR PRODUCING HALOGENATED ZINC PHTHALOCYANINE PIGMENT FOR COLOR FILTER

(71) Applicant: DIC Corporation, Tokyo (JP)

(72) Inventors: Keisuke Sakamoto, Sakura (JP); Kentaro Oishi, Sakura (JP); Ryousuke Asami, Sakura (JP); Mayumi Tokuoka, Kamisu (JP); Katsunori Shimada, Sakura (JP); Keisuke Fujisawa, Sakura (JP)

(73) Assignee: DIC CORPORATION, Tokyo (JP)

( * ) Notice: Subject to any disclaimer, the term of this patent is extended or adjusted under 35 U.S.C. 154(b) by 626 days.

(21) Appl. No.: 17/289,024

(22) PCT Filed: Apr. 28, 2020

(86) PCT No.: PCT/JP2020/018134
§ 371 (c)(1),
(2) Date: Apr. 27, 2021

(87) PCT Pub. No.: WO2020/204210
PCT Pub. Date: Oct. 8, 2020

(65) Prior Publication Data
US 2022/0002550 A1 Jan. 6, 2022

(30) Foreign Application Priority Data
Dec. 9, 2019 (JP) ................................ 2019-222361

(51) Int. Cl.
*C09B 47/10* (2006.01)
*C09B 67/20* (2006.01)
*G02B 5/20* (2006.01)

(52) U.S. Cl.
CPC .......... *C09B 47/10* (2013.01); *C09B 67/0067* (2013.01); *G02B 5/20* (2013.01)

(58) Field of Classification Search
CPC ........ C09B 47/10; C09B 67/0067; G02B 5/20
See application file for complete search history.

(56) References Cited

U.S. PATENT DOCUMENTS

| | | |
|---|---|---|
| 2011/0249223 A1 | 10/2011 | Suh et al. |
| 2014/0150692 A1 | 6/2014 | Tsuchiya et al. |
| 2015/0315361 A1 | 11/2015 | Fujimaki et al. |

FOREIGN PATENT DOCUMENTS

| | | |
|---|---|---|
| CN | 102015910 A | 4/2011 |
| CN | 102549080 A | 7/2012 |
| CN | 103529646 A | 1/2014 |
| CN | 103649788 A | 3/2014 |
| CN | 105829925 A | 8/2016 |
| CN | 106716190 A | 5/2017 |
| CN | 107880586 A | 4/2018 |
| CN | 109563355 A | 4/2019 |
| CN | 109642970 A | 4/2019 |
| CN | 109863208 A | 6/2019 |
| JP | H05-178616 A | 7/1993 |
| JP | 6-336556 A | 12/1994 |
| JP | 2010-084119 A | 4/2010 |
| JP | 2011-242425 A | 12/2011 |
| JP | 5141939 B2 | 2/2013 |
| JP | 5354317 B1 | 11/2013 |
| JP | 2014-85562 A | 5/2014 |
| JP | 2016-57635 A | 4/2016 |
| JP | 2018-066806 A | 4/2018 |
| KR | 10-2013-0110094 A | 10/2013 |
| KR | 10-2014-0043816 A | 4/2014 |
| TW | 201431972 A | 8/2014 |
| WO | 2010/140519 A1 | 12/2010 |
| WO | 2018/043548 A1 | 3/2018 |

OTHER PUBLICATIONS

International Search Report dated Jul. 7, 2020, issued in counterpart International Application No. PCT/JP2020/018134, w/English translation (4 pages).
Office Action dated Feb. 2, 2021, issued in counterpart CN Patent Application No. 202080001666.2, w/English translation (13 pages).
Takashi Deno, Micronization and Dispersion of Organic Pigments, Journal of the Imaging Society of Japan, 2006, vol. 15, No. 5, p. 434-443, with English Abstract; Cited in CN Office Action dated Feb. 2, 2021.
Natsu Ueda, Crystalline powder conversion and solvent effect, Chemistry & Chemical Industry, 1969, vol. 22, No. 5, pp. 110-125, with Partial Translation; Cited in CN Office Action dated Feb. 2, 2021.
Notice of Allowance dated Jun. 24, 2021, issued in counterpart KR Application No. 10-2020-7034298, with English Translation. (3 pages).
Notice of Allowance dated Jun. 24, 2021, issued in counterpart CN Application No. 202080001666.2, with English Translation of Search Report. (5 pages).
Office Action dated Jul. 13, 2021, issued in counterpart TW Application No. 109114197, with English Translation of Search Report. (5 pages).

*Primary Examiner* — Paul V Ward

(74) *Attorney, Agent, or Firm* — WHDA, LLP

(57) ABSTRACT

There is provided a novel halogenated zinc phthalocyanine pigment for a color filter, which can form a green color filter having excellent contrast and high luminance. A halogenated zinc phthalocyanine pigment for a color filter shows, in a Raman spectrum, a peak intensity of 3.0% or more at 716±2.2 $cm^{-1}$ when a peak intensity at 650±10 $cm^{-1}$ is regarded as 100%.

12 Claims, 7 Drawing Sheets

HALOGENATED ZINC PHTHALOCYANINE PIGMENT FOR COLOR FILTER AND METHOD FOR PRODUCING HALOGENATED ZINC PHTHALOCYANINE PIGMENT FOR COLOR FILTER

TECHNICAL FIELD

The present invention relates to a halogenated zinc phthalocyanine pigment for a color filter and a method for producing a halogenated zinc phthalocyanine pigment for a color filter.

This application claims priority based on Japanese Application No. 2019-222361 filed in Japan on Dec. 9, 2019, the contents of which are incorporated herein.

BACKGROUND ART

Color filters used for liquid crystal displays are members which transmit white light of backlight and converts the white light to red, green, and blue, thereby realizing color display on displays. Among these, a green coloring agent for a color filter is required to produce higher luminance and higher color reproduction.

In order to achieve higher luminance in a green color filter, it is important to select a pigment having high transmittance for light of backlight, and Pigment Green 58 is used as a main pigment. An existing display is designed so as to have higher luminance according to the sRGB standard ((x, y)=(0.300, 0.600) for a green pixel), and LED-YAG is widely used as backlight.

In addition, in order to achieve higher color reproduction in a green color filter, a pigment capable of bright color display is selected. It is proposed to achieve high color reproduction by forming green pixels using a green curable resin composition containing Pigment Green 7 and Pigment Yellow 185, but Pigment green 7 has low transmittance and thus the resultant display has low luminance. There is Pigment Green 59 as a novel high color reproduction pigment, and, in comparison between color filters having the same thickness, the use of Pigment Green 59 exhibits higher luminance than Pigment Green 7 (refer to, for example, Patent Literature 1). A color filter may be designed to have a large thickness for covering the standards of high-color-reproduction display (Adobe RGB, DCI-P3, and the like), but there occurs the problem of failing to sufficiently cure the color filter in an exposure step, and thus a pigment capable of bright color display is preferably used.

From the above, it is recognized that it is preferred to use Pigment Green 58 for a green color filter for high-luminance display and to use Pigment Green 59 for a green color filter for high-color-reproduction display.

Any of these pigments has the highest luminance among existing pigments for green color filters, but when it becomes possible to efficiently use white light of backlight, energy saving and production cost down of displays can be achieved, and thus luminance is desired to be further improved. Further, in use at a high pigment concentration for achieving bright display, white blurring easily occurs in display, and thus contrast is also desired to be improved.

In addition, large differences between a color filter for high-luminance display and a color filter for high-color-reproduction display include chromaticity for green pigment design and backlight (light source).

A mainstream green color filter for existing high-luminance display has chromaticity of sRGB (x, y)=(0.300, 0.600) and LED-YAG for backlight (light source). However, LED-YAG depends on manufactures, and thus a color filter for high-luminance display is often evaluated with (x, y)= (0.275, 0.570) by using a C light source (refer to, for example, Patent Literature 2).

A color filter with chromaticity of Adobe RGB and LED-RG as backlight (light source) is estimated as a green color filter for high-color-reproduction display. However, LED-RG also depends on manufactures, and thus a color filter for high-color-reproduction display is often evaluated with (x, y)=(0.230, 0.670) by using a C light source (refer to, for example, Patent Literature 3).

CITATION LIST

Patent Literature

PTL 1: Japanese Unexamined Patent Application Publication No. 2016-057635
PTL 2: Japanese Unexamined Patent Application Publication No. 2014-085562
PTL 3: Japanese Unexamined Patent Application Publication No. 2011-242425

SUMMARY OF INVENTION

Technical Problem

However, there is demand for a novel pigment for a color filter which can forms a green color filter having more excellent contrast and high luminance in the specifications of both high-luminance display and high-color-reproduction display.

The present invention has been achieved in consideration of the situation described above and provides a novel halogenated zinc phthalocyanine pigment for a color filter, which can form a green color filter having excellent contrast and high luminance, and also provides a method for producing a halogenated zinc phthalocyanine pigment for a color filter.

Solution to Problem

As a result of earnest research for solving the problem described above, the inventors found that a green color filter having excellent contrast and high luminance can be formed by forming a pigment by heating a halogenated zinc phthalocyanine crude pigment under pressure in water, leading to the achievement of the present invention.

That is, the present invention includes the following forms.
 [1] A halogenated zinc phthalocyanine pigment for a color filter, wherein in a Raman spectrum, a peak intensity at $716\pm2.2$ cm$^{-1}$ is 3.0% or more when a peak intensity at $650\pm10$ cm$^{-1}$ is regarded as 100%.
 [2] The halogenated zinc phthalocyanine pigment for a color filter described above in [1], wherein an intensity at 328 cm$^{-1}$ is 4.5% or more when a peak intensity at $650\pm10$ cm$^{-1}$ is regarded as 100%.
 [3] The halogenated zinc phthalocyanine pigment for a color filter described above in [1] or [2], wherein a peak intensity at $321\pm2.2$ cm$^{-1}$ is 12.5% or less when a peak intensity at $650\pm10$ cm$^{-1}$ is regarded as 100%.
 [4] A halogenated zinc phthalocyanine pigment for a color filter, wherein in a Raman spectrum, a peak intensity at $713\pm2.2$ cm$^{-1}$ is 1.5% or more when a peak intensity at $650\pm10$ cm$^{-1}$ is regarded as 100%.

[5] The halogenated zinc phthalocyanine pigment for a color filter described above in [4], wherein a peak intensity at 328±2.2 cm$^{-1}$ is 2.5% or more when a peak intensity at 650±10 cm$^{-1}$ is regarded as 100%.

[6] A pigment dispersion for a color filter including the halogenated zinc phthalocyanine pigment for a color filter described above in any one of [1] to [5] and a dispersant.

[7] A curable composition for a color filter green pixel portion, including the pigment dispersion for a color filter described above in [6] and a curable resin.

[8] A method for producing a halogenated zinc phthalocyanine pigment for a color filter, including heating a halogenated zinc phthalocyanine crude pigment under pressure in water to form a pigment.

[9] The method for producing a pigment for a color filter described above in [8], wherein the primary particles of the halogenated zinc phthalocyanine pigment for a color filter have an average particle diameter of 10 to 40 nm.

[10] The method for producing a halogenated zinc phthalocyanine pigment for a color filter described above in [8] or [9], wherein the heating temperature is 100° C. to 160° C.

[11] A method for producing a pigment dispersion for a color filter, including mixing a pigment for a color filter produced by the method described above in any one of [8] to [10] with a dispersant.

[12] A method for producing a color filter including preparing a curable composition for a color filter green pixel portion by mixing a pigment dispersion for a color filter produced by the method described above in [11] with a curable resin, and applying the curable composition for a color filter green pixel portion on a transparent substrate.

Advantageous Effects of Invention

According to the present invention, it is possible to provide a novel halogenated zinc phthalocyanine pigment for a color filter, which can form a green color filter having excellent contrast and high luminance, and also provide a pigment dispersion for a color filter, a curable composition for a color filter green pixel portion, a method for producing a halogenated zinc phthalocyanine pigment for a color filter, a method for producing a pigment dispersion for a color filter, and a method for a color filter.

DESCRIPTION OF EMBODIMENTS

<<Pigment for Color Filter>>

Figure 1:
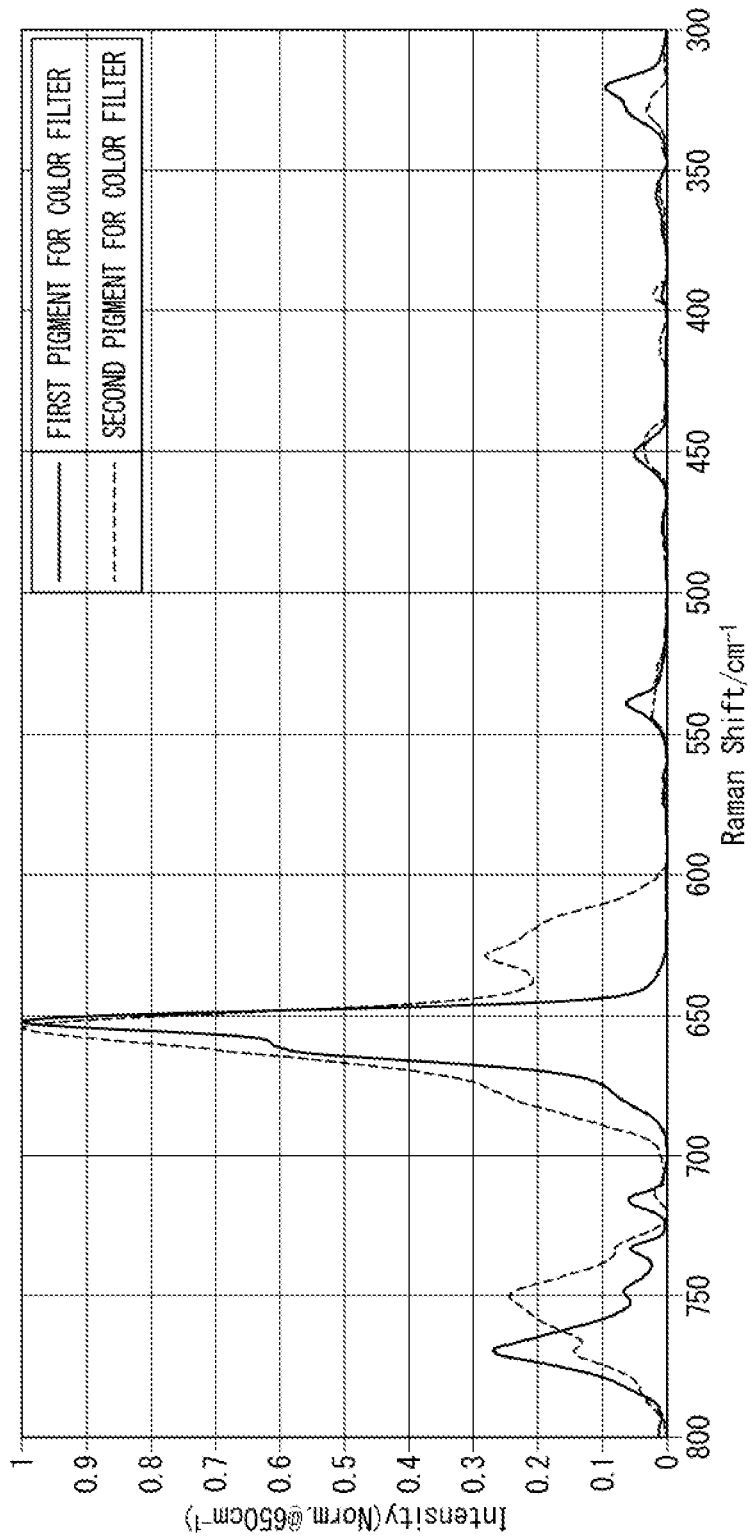
FIG. 1 is a diagram showing examples of Raman spectra of a first pigment for a color filter and a second pigment for a color filter as a halogenated zinc phthalocyanine pigment for a color filter according to an embodiment of the present invention.

A halogenated zinc phthalocyanine pigment for a color filter (also referred to as a "pigment for a color filter" hereinafter) according to an embodiment of the present invention has, in a Raman spectrum, a peak intensity within a specific range at 716±2.2 cm$^{-1}$ or 713±2.2 cm$^{-1}$ when a peak intensity at 650±10 cm$^{-1}$ is regarded as 100%. The Raman spectrum can be detected by, for example, laser Raman spectroscopy using a laser as an excitation light source.

In the present specification, halogenated zinc phthalocyanine is a compound represented by the following formula (1).

[Chem. 1]

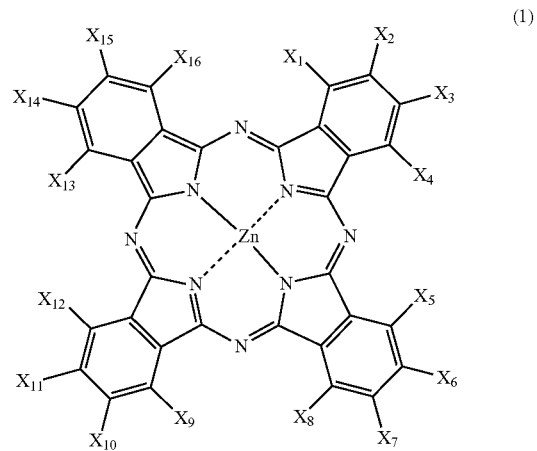

(1)

In the formula, $X_1$ to $X_{16}$ are each independently a chlorine atom, a brome atom, or a hydrogen atom.

That is, the halogenated zinc phthalocyanine is a cyclic compound having a structure in which four phthalic imides are crosslinked through nitrogen atoms, and the compound has a structure having a Zn (zinc) atom at a center and four central nitrogen atoms chemically bonded (for example, covalent-bonded, coordinate-bonded, or the like) to the Zn (zinc) atom The halogenated zinc phthalocyanine is preferably brominated/chlorinated zinc phthalocyanine.

When the halogenated zinc phthalocyanine is brominated/chlorinated zinc phthalocyanine, from the viewpoint that a green color filter can be adjusted to preferred chromaticity, the average number of halogen atoms contained per molecule is preferably 11 or more and 16 or less and more preferably 12 or more and 16 or less. The average number of bromine contained per molecule is preferably 7 or more and 16 or less and more preferably 3 or more and 15 or less. The average number of chlorine contained per molecule is preferably 0.5 or more and 4 or less and more preferably 1 or more and 3 or less.

For example, when as in halogenated zinc phthalocyanine containing 5 halogen atoms at the α positions or the like, the adjacent halogen substituents at the periphery of the cyclic compound are close to each other (in the formula (1), $X_4$ and $X_5$, $X_8$ and $X_9$, and the like), several stable conformations such as a saddle type, a wave type, and the like are present. Also, a pigment for a color filter containing 9 or more halogen atoms on average contains a large amount of halogenated zinc phthalocyanine containing 5 or more halogen atoms at the α positions.

The wave type contains phthalocyanine having a structure close to a plane, while the saddle type if entirely distorted and contains phthalocyanine having a dome-like structure. The distorted structure causes the repulsion between adjacent π electrons, thereby destabilizing the HOMO molecular orbital. Therefore, an absorption spectrum of the saddle type is located on the longer wavelength side than an absorption spectrum of the wave type.

A green color filter is required to transmit light at 480 nm to 580 nm and absorb light at other wavelengths, and in general, light at a short wavelength of less than 480 nm is separately absorbed by a yellow pigment, and light at a long wavelength longer than 580 nm is absorbed by a green pigment. As described above, an absorption spectrum of the saddle type is located on the longer wavelength side than an absorption spectrum of the wave type, and thus a high content of saddle-type halogenated zinc phthalocyanine causes a gentle increase in the absorption spectrum of a green pigment before and after 580 nm, thereby resulting in slight deterioration in light absorption near 580 nm as compared with a low content of saddle-type halogenated zinc phthalocyanine. Therefore, when the halogenated zinc phthalocyanine has both the saddle-type and the wave-type, from the viewpoint of exhibiting higher luminance, the pigment for a color filter preferably contains the wave-type halogenated zinc phthalocyanine in a larger amount than that of the saddle-type halogenated zinc phthalocyanine.

When the pigment for a color filter contains the wave-type halogenated zinc phthalocyanine in a larger amount than that of the saddle-type halogenated zinc phthalocyanine, a peak intensity strongly appears near 716 $cm^{-1}$ in a Raman spectrum when the peak intensity at 650±10 $cm^{-1}$ is regarded as 100%. Therefore, when a specific peak intensity near 716 $cm^{-1}$ is a value within a predetermined range, the halogenated zinc phthalocyanine contained in the pigment for a color filter according to the embodiment of the present invention can be specified.

FIG. 1 is a diagram showing examples of Raman spectra of a first pigment for a color filter and a second pigment for a color filter. As shown in the diagram, the first pigment for a color filter according to the embodiment shows a Raman spectrum having a characteristic peak intensity near 716 $cm^{-1}$ and characteristic peak intensities at 328 $cm^{-1}$ and near 321 $cm^{-1}$ when a peak intensity at 650±10 $cm^{-1}$ is regarded as 100%. The second pigment for a color filter according to the embodiment shows a Raman spectrum having a characteristic peak intensity near 713 $cm^{-1}$ and characteristic peak intensity near 328 $cm^{-1}$ when a peak intensity at 650±10 $cm^{-1}$ is regarded as 100%. In the present specification, the "near" in the description of a peak intensity in a Raman spectrum represents, for example, ±2.2 $cm^{-1}$ with respect to the Raman shift value described, and the "peak intensity" represents, for example, the maximum value of intensity within a range of the Raman shift value described±2.2 $cm^{-1}$.

<First Pigment for Color Filter>

In addition, the first pigment for a color filter has, in a Raman spectrum, a peak intensity of 3.0% or more (for example, 3.0% to 20.0%), preferably 4.0% or more, more preferably 4.6% or more, and still more preferably 5.0% or more at 716±2.2 $cm^{-1}$ when a peak intensity at 650±10 $cm^{-1}$ is regarded as 100%. When the peak intensity at 716±2.2 $cm^{-1}$ is 3.0% or more, it can be clearly determined that the first pigment for a color filter contains a large amount of wave-type halogenated zinc phthalocyanine. Higher luminance can be realized by using the first pigment for a color filter.

In addition, the first pigment for a color filter has a peak intensity of 4.5% or more (for example, 4.5% to 10.0%), preferably 5.0% or more, and more preferably 5.7% or more at 323 $cm^{-1}$ when a peak intensity at 650±10 $cm^{-1}$ is regarded as 100%. When the peak intensity at 323 $cm^{-1}$ is 4.5% or more, it can be clearly determined that the first pigment for a color filter contains a large amount of wave-type halogenated zinc phthalocyanine.

Also, when a peak intensity at 650±10 $cm^{-1}$ is regarded as 100%, a peak intensity at 321±2.2 $cm^{-1}$ is preferably 12.5% or less (for example, 3.0% to 12.5%), more preferably 12.0% or less, and particularly preferably 11.5% or less. Also, the peak intensity is preferably 5.0% or more, more preferably 7.0% or more, and particularly preferably 9.0% or more. The peak intensity at 321±2.2 $cm^{-1}$ is preferably 7.0% to 12.5%. When the peak intensity at 321±2.2 $cm^{-1}$ is within the range described above, it can be more clearly determined that the first pigment for a color filter contains a large amount of the wave-type halogenated zinc phthalocyanine.

<Second Pigment for Color Filter>

In the embodiment of the present invention, the second pigment for a color filter preferably has a peak intensity of 1.5% or more (for example, 1.5% to 5.0%) and more preferably 1.8% or more at 713±2.2 $cm^{-1}$ when a peak intensity at 650±10 $cm^{-1}$ is regarded as 100%. When the peak intensity at 713±2.2 $cm^{-1}$ is 1.5% or more, it can be clearly determined that the second pigment for a color filter contains a large amount of wave-type halogenated zinc phthalocyanine, and higher luminance and higher color reproduction can be realized by using the second pigment for a color filter.

Also, in the second pigment for a color filter, when a peak intensity at 650±10 $cm^{-1}$ is regarded as 100%, a peak intensity at 328±2.2 $cm^{-1}$ is preferably 2.5% or more (for example, 2.5% to 5.0%) and more preferably 2.9% or more. When the peak intensity at 328±2.2 $cm^{-1}$ is 2.5% or more, it can be clearly determined that the second pigment for a color filter contains a large amount of the wave-type halogenated zinc phthalocyanine.

The pigment for a color filter is composed of one or a plurality of particles. The primary particles of the pigment for a color filter preferably have an average particle diameter (average primary particle diameter) of 10 nm or more, more preferably 15 nm or more, and still more preferably 20 nm or more. The average primary particle diameter of the pigment for a color filter is preferably 200 nm or less, more preferably 100 nm or less, and still more preferably 70 nm or less. In addition, the average particle diameter of the primary particles of the pigment for a color filter is preferably 10 nm or more and 40 nm or less, more preferably 15 to 35 nm, and still more preferably 20 nm to 30 nm. When the average particle diameter of primary particles is 10 to 40 nm, pigment aggregation is relatively weak, and dispersibility in a synthetic resin or the like to be colored is improved. The average primary particle diameter is the average value of the long diameters of primary particles and can be determined by measuring the long diameters of primary particles in the same manner as for measurement of average aspect ratio described later.

From the viewpoint that more excellent contrast can be obtained, the average aspect ratio of primary particles of the pigment for a color filter is preferably less than 5.0, more preferably less than 4.0, still more preferably 3.0 or less, and particularly preferably 2.0 or less. In addition, the average aspect ratio of primary particles of the pigment for a color filter is preferably 1.0 to 3.0 and more preferably 1.0 to 2.0.

The pigment for a color filter containing primary particles having an average aspect ratio within a range of 1.0 to 3.0 preferably does not contain primary particles having an aspect ratio of 5 or more, more preferably does not contain primary particles having an aspect ratio of 4 or more, and still more preferably does not contain primary particles having an aspect ratio exceeding 3.

The aspect ratios and average aspect ratio of the primary particles can be measured by the following method. First, particles in a field of view are photographed by a transmission electron microscope (for example, JEM-2010 manufactured by JEOL, Ltd.). Then, the longer diameters (long diameters) and shorter diameters (short diameters) of the primary particles present in a two-dimensional image are measured, and the ratio of long diameter to short diameter is determined as the aspect ratio of the primary particle. In addition, the average values of long diameters and short diameters of 40 primary particles are determined, and the ratio of long diameter to short diameter is calculated by using the average values. This ratio is regarded as the average aspect ratio. In this case, the pigment for a color filter used as a sample is ultrasonically dispersed in a solvent (for example, cyclohexane) and then photographed by the microscope. Also, a scanning electron microscope may be used in place of the transmission electron microscope.

The particle size distribution of the pigment for a color filter preferably has an arithmetic standard deviation of 25 nm or less and more preferably 20 nm or less. As described above, from the viewpoint of luminance and contrast, the particle size distribution preferably has a smaller arithmetic standard deviation, but the particle size distribution of a pigment which can be generally produced as a pigment for a color filter has an arithmetic standard deviation of 10 nm or more. Therefore, in practical use, the arithmetic standard deviation of the particle size distribution is preferably 10 to 25 nm and more preferably 10 to 20 nm. Like in measurement of the arithmetic standard deviation of the particle size distribution of halogenated zinc phthalocyanine crude pigment, the arithmetic standard deviation of the particle size distribution can be measured by using a dynamic light scattering particle size distribution analyzer described later, and the measurement can be performed by a method under conditions described later.

<<Method for Producing Pigment for Color Filter>>

A method for producing the pigment for a color filter according to an embodiment of the present invention includes heating the halogenated zinc phthalocyanine crude pigment under pressure in water to form a pigment.

The method for producing the pigment for a color filter according to the embodiment includes heating the halogenated zinc phthalocyanine crude pigment under pressure in water to form a pigment, and thus a color filter formed by using the resultant pigment for a color filter is excellent in contrast and luminance.

More specifically, a color filter formed by using the pigment for a color filter produced by the production method according to the embodiment is excellent in contrast and luminance as compared with a color filter formed by using a usual pigment for a color filter produced by grinding, with a kneader, a halogenated zinc phthalocyanine crude pigment to form a pigment.

This is supposed to be greatly influenced by the fact that the crude pigment immediately after synthesis has nonuniform particle sizes and contains primary particles containing very small particles and very large particles, while the pigment formed by heating the halogenated zinc phthalocyanine crude pigment under pressure in water can be adjusted to have primary particle diameters within a very narrow size distribution range.

When a color filter is formed by directly using a crude pigment, particles having a very small primary particle diameter are grown to particles having a large primary particle diameter through a process of dissolution in a solvent and a resin component and repetition of precipitation and dissolution. This results in decreases in contrast and luminance. On the other hand, the method for producing the pigment for a color filter according to the embodiment can grow the primary particles to a degree which causes no dissolution in a solvent and a resin component, and thus it is supposed that a color filter having high contrast and luminance can be formed.

In the method for producing the pigment for a color filter according to the embodiment, the arithmetic standard deviation of the particle size distribution can be used as an index indicating that the halogenated zinc phthalocyanine crude pigment has a uniform particle size. The arithmetic standard deviation of the halogenated zinc phthalocyanine crude pigment is preferably 15 nm or more and 1500 nm or less. The arithmetic standard deviation can be measured by using a dynamic light scattering particle size distribution analyzer and specifically can be measured by a method under conditions described below.

(Method)

First, 2.48 g of halogenated zinc phthalocyanine crude pigment is dispersed for 2 hours together with 1.24 g of BYK-LPN6919 manufactured by BYK Chemie Co., Ltd., 1.86 g of Unidic ZL-295 manufactured by DIG Corporation, and 10.92 g of propylene glycol monomethyl ether acetate by a paint shaker manufactured by Toyo Seiki Co., Ltd. using zircon beads of 0.3 to 0.4 mm, preparing a dispersion. The zircon beads are removed by a nylon mesh, and then 0.02 g of the dispersion is diluted with 20 g of propylene glycol monomethyl ether acetate, preparing a dispersion for particle size distribution measurement.

(Condition)

Measurement apparatus: dynamic light scattering particle size distribution analyzer LB-550 (manufactured by Horiba, Ltd.)

Measurement temperature: 25° C.

Measurement sample: dispersion for particle size distribution measurement

Data analysis condition: particle diameter-based scattering light intensity, dispersion medium refractive index 1.402

Also, in the method for producing the pigment for a color filter according to the embodiment, the pigment formation is allowed to proceed while disaggregating secondary particles by controlling the temperature and the pressure applied, and thus the average particle diameter of primary particles can be controlled to a size suitable for a color filter without producing crude particles.

In the method for producing the pigment for a color filter according to the embodiment, the halogenated zinc phthalocyanine crude pigment is (1) a water-containing crude pigment produced by filtering and water-washing a solvent-containing crude pigment in an unpurified state immediately after synthesis, (2) a solvent-containing crude pigment after purification with various solvents or the like, (3) a crude pigment produced by drying the water-containing crude pigment or the solvent-containing crude pigment, or (4) a crude pigment produced by further grinding after the drying, and thus the crude pigment represents halogenated zinc phthalocyanine before pigment formation. The water-containing crude pigment produced by taking out the halogenated zinc phthalocyanine and placing it in water immediately after synthesis, followed by filtration and water washing, is preferably used as the halogenated zinc phthalocyanine crude pigment and heated in water, forming a pigment. The crude pigment produced by drying the water-containing crude pigment may be used as the halogenated zinc phthalocyanine crude pigment.

In order to produce the preferred pigment for a color filter according to the embodiment, 100 parts by dry mass of halogenated zinc phthalocyanine crude pigment is preferably heated together with 300 to 6000 parts by mass of water, preferably heated together with 450 to 4500 parts by mass of water, or preferably heated tougher with 600 to 3000 parts by mass of water.

The temperature during heating is preferably 30° C. to 180° C., more preferably 80° C. to 160° C., and particularly preferably 100° C. to 160° C. The heating time is preferably 30 minutes to 30 hours and more preferably 1 hour to 10 hours.

The method for producing the pigment for a color filter according to the embodiment preferably uses an apparatus having a closed vessel for controlling the pressure in addition to the temperature.

In the method for producing the pigment for a color filter according to the embodiment, the pressure in the closed vessel of the apparatus is preferably normal pressure or more. The pressure is preferably within a range of normal pressure to 2 MPa. The upper limit of pressure is preferably 1 MPa, more preferably 0.6 MPa, and particularly preferably 0.3 MPa. In addition, inert gas such as nitrogen, argon, or the like may be introduced into the closed vessel.

The amount of water in the closed vessel of the apparatus is not particularly limited, but is preferably 10% to 90% by volume and more preferably 40% to 30% by volume relative to 100% by volume of the vessel reference volume of the closed vessel.

In the method for producing the pigment for a color filter according to the embodiment, preferably, the temperature is 100° C. to 160° C., the pressure is within a range of normal pressure to 0.6 MPa, and the pigment is formed by using 450 to 4500 parts by mass of water relative to 100 parts by dry mass of the halogenated zinc phthalocyanine crude pigment.

The hydrogen ion index during heating is preferably adjusted to pH 2 to pH 12, more preferably adjusted to pH 2.5 to pH 11.5, and particularly preferably adjusted to pH 3 to pH 10. A pH adjustor may be used for adjusting the pH within the range described above. Examples of the pH adjuster include well-known/common ones such as hydrochloric acid, sulfuric acid, phosphoric acid, potassium hydroxide, sodium hydroxide, and the like.

The pigment for a color filter according to the embodiment can be produced by the production method described above, but if required, a powder of a pigment for a color filter composed of halogenated zinc phthalocyanine can be produced by washing, filtration, drying, grinding, etc. using a solid mainly composed of halogenated zinc phthalocyanine.

In addition, a heat-resistant pressure-resistant reactor is generally used as the closed vessel possessed by the apparatus used in the method for producing the pigment for a color filter according to the embodiment. The closed vessel or the apparatus having the closed vessel is preferably an autoclave. In addition, the apparatus having the closed vessel preferably has a paddle or propeller capable of stirring so that the contents in the vessel become uniform. The apparatus is, for example, a stirrer, and, for example, a concentric-type twin-screw stirrer manufactured by Asada Iron Works, Co., Ltd. can be used.

Either water washing or hot-water washing can be used as washing. The number of times of washing may be the number of repetitions within a range of 1 to 5. An inorganic salt used for pH adjustment can be easily removed by water washing. If required, acid washing, alkali washing, or organic solvent washing may be performed so as not to change a crystal state.

The drying after filtration and washing is, for example, batch-type or continuous drying or the like for removing at least one of water and the solvent of the pigment by heating at 80° C. to 120° C. or the like using a heating source installed in a dryer. Examples of the dryer generally include a box-type dryer, a band drier, a spray dryer, and the like. In particular, spray drying is preferred because of easy dispersion when a paste is formed. Grinding after drying is not an operation for increasing the specific surface area or decreasing the average particle diameter of primary particles, but is performed for disaggregating the pigment when the pigment is in a lump shape or the like, for example, as in the case of drying with a box-type dryer or a band dryer. Examples of a grinder used after drying include a mortar, a hummer mill, a disk mill, a pin mill, a jet mill, and the like. Aa result, a dry powder of the pigment for a color filter containing halogenated zinc phthalocyanine as a main component can be produced.

<Method for Producing First Pigment for Color Filter and Second Pigment for Color Filter>

The first pigment for a color filter can be produced by, for example, using a first halogenated zinc phthalocyanine crude pigment containing halogenated zinc phthalocyanine described below and heating it under pressure in water to form a pigment.

In the first halogenated zinc phthalocyanine crude pigment, the average number of bromine atoms per molecule of the compound represented by the formula (1) is, for example, 13 or more. The number of halogens is not changed before and after the pigment formation, and thus the halogenated zinc phthalocyanine contained in the first halogenated zinc phthalocyanine crude pigment can be represented by the formula (1). When the first pigment for a color filter produced from the first halogenated zinc phthalocyanine crude pigment is used as a green pigment, more excellent luminance can be obtained by combination with a known usual yellow pigment. From the above viewpoint, the average number of bromine atoms is preferably 14 or more. From the viewpoint of enabling further thinning in combination with a known usual yellow pigment, the average number of bromine atoms is preferably 15 or more.

When the average number of bromine atoms is 13 or more, from the viewpoint that more excellent luminance can be obtained in combination with a known usual yellow pigment, the average number of halogen atoms per molecule of the compound represented by the formula (1) in the first halogenated zinc phthalocyanine crude pigment is preferably 13 or more, more preferably 14 or more, and still more preferably 15 or more. The average number of halogen atoms is 16 or less, and from the viewpoint of enabling further thinning in combination with a known usual yellow pigment, the average number is preferably 15.8 or less.

When the average number of bromine atoms is 13 or more, from the viewpoint that more excellent luminance can be obtained in combination with a known usual yellow pigment, the average number of chlorine atoms per molecule of the compound represented by the formula (1) in the first halogenated zinc phthalocyanine crude pigment is preferably 0.1 or more and more preferably 1 or more. From the viewpoint of enabling further thinning in combination with a known usual yellow pigment, the average number of chlorine atoms is preferably 5 or less, more preferably 3 or less, and still more preferably less than 2.

When the average number of halogen atoms is 14 or more and 16 or less, the average number of bromine atoms is 13 or more and 15 or less, and the average number of chlorine atoms is 1 or more and 3 or less, more excellent luminance can be obtained in combination with a known usual yellow pigment.

Also, the second pigment for a color filter can be produced by, for example, using a second halogenated zinc phthalocyanine crude pigment containing halogenated zinc phthalocyanine described below and heating it under pressure in water to form a pigment.

In the second halogenated zinc phthalocyanine crude pigment, the average number of bromine toms per molecule of the compound represented by the formula (1) is less than 13. The number of halogens is not changed before and after the pigment formation, and thus the halogenated zinc phthalocyanine contained in the first halogenated zinc phthalocyanine crude pigment can be represented by the formula (1). When the second pigment for a color filter produced from the second halogenated zinc phthalocyanine crude pigment is used as a green pigment, further thinning can be made by combination with a known usual yellow pigment. From the above viewpoint, the average number of bromine atoms is preferably 12 or less and more preferably 11 or less. From the viewpoint that more excellent luminance can be obtained in combination with a known usual yellow pigment, the average number of bromine atoms is preferably 0.1 or more, more preferably 6 or more, and still more preferably 8 or more. The upper limit value and the lower limit value can be arbitrarily combined. For example, the average number of bromine atoms may be 0.1 or more and less than 13, 8 to 12, or 8 to 11. In addition, in the same description below, the upper limit value and the lower limit value independently described can be arbitrarily combined.

When the average number of bromine atoms is less than 13, from the viewpoint that further thinning can be made in combination with a known usual yellow pigment, the average number of halogen atoms per molecule of the compound represented by the formula (1) in the second halogenated zinc phthalocyanine crude pigment is preferably 14 or less, more preferably 13 or less, and may be less than 13 or 12 or less. From the viewpoint of that more excellent luminance can be obtained in combination with a known usual yellow pigment, the average number of halogen atoms is preferably 0.1 or more, more preferably 8 or more, and still more preferably 10 or more.

When the average number of bromine atoms is less than 13, from the viewpoint that further thinning can be made in combination with a known usual yellow pigment, the average number of chlorine atoms per molecule of the compound represented by the formula (1) in the second halogenated zinc phthalocyanine crude pigment is preferably 5 or less, more preferably 3 or less, still more preferably 2.5 or less, and particularly preferably less than 2. From the viewpoint of that more excellent luminance can be obtained in combination with a known usual yellow pigment, the average number of chlorine atoms is preferably 0.1 or more, more preferably 0.3 or more, still more preferably 0.6 or more, particularly preferably 0.8 or more, extremely preferably 1 or more, and further preferably 1.3 or more. The average number of chlorine atoms may be 2 or more.

When the average number of halogen atoms is 13 or less, the average number of bromine atoms is 11 or less, and the average number of chlorine atoms is less than 2, more excellent luminance can be obtained. From the viewpoint of enabling to obtain the effect described above, preferably, the average number of bromine atoms is 8 to 11, and the average number of chlorine atoms is 0.1 or more and less than 2.

Further, from the viewpoint that further thinning can be made in combination with a known usual yellow pigment, preferably, the average number of halogen atoms is 10 to 14, the average number of bromine atoms is 8 to 12, and the average number of chlorine atoms is 2 to 5.

The number of halogen atoms such as the bromine atoms and the chlorine atoms in halogenated zinc phthalocyanine can be measured by mass spectrometry. The mass spectrometry can be performed by using a matrix-assisted laser desorption/ionization time-of-flight mass spectrometer (for example, JMS-S3000 manufactured by JEOL, Ltd.). Specifically, in the case of mass spectrometry of a compound having a known molecular weight Q, each of the measurement parameters is set so as to detect m/z=Q. In the embodiment, in the case of mass spectrometry of a known compound with a molecular weight of 1840, setting of JMS-S3000 is adjusted so as to detect m/z=1840.

(Method for Producing Halogenated Zinc Phthalocyanine Crude Pigment)

The halogenated zinc phthalocyanine crude pigment can be produced by, for example, a known production method such as a chlorosulfonic acid method, a halogenated phthalonitrile method, a melting method, or the like.

The chlorosulfonic acid method is, for example, a method of dissolving zinc phthalocyanine in a sulfur oxide-based solvent such as chlorosulfonic acid or the like and then halogenating by charging chlorine gas and bromine, or the like. This reaction is performed within a range in which the temperature is 20° C. to 120° C. and the time is 3 to 20 hours.

The halogenated phthalonitrile method is, for example, a method using, as proper starting raw materials, phthalic acid or phthalodinitrile in which hydrogen atoms of an aromatic ring are partially or entirely substituted by halogen atoms such as bromine, chlorine, or the like, and zinc metal or metal salt, thereby synthesizing the corresponding halogenated zinc phthalocyanine. In this case, if required, a catalyst such as ammonium molybdate or the like may be used. This reaction is performed within a range in which the temperature is 100° C. to 300° C. and the time is 7 to 35 hours.

The melting method is, for example, a method of halogenating zinc phthalocyanine with a halogenating agent at about 10° C. to 170° C. in a melt composed of a mixture of one or two or more of compounds serving as a solvent for halogenation, such as aluminum halides such as aluminum chloride, aluminum bromide, and the like, titanium halides such as titanium tetrachloride and the like, alkali metal halides or alkaline-earth metal halides (may be referred to as "alkali (earth) metal halides" hereinafter) such as sodium chloride, sodium bromide, and the like, thionyl chloride, and the like.

The aluminum halide is preferably aluminum chloride. In the melting method using the aluminum halide, the amount of aluminum halide added is generally 3-time moles or more and preferably 10 to 20-time moles relative to the zinc phthalocyanine.

The aluminum halides may be used alone, but combination of the aluminum halide with alkali (earth) metal halide can further decrease the melting temperature and is thus advantageous for operation. The alkali (earth) metal halide is preferably sodium chloride. The amount of the alkali (earth) metal halide is within a range in which a melt salt is produced, and the alkali (earth) metal halide is preferably 5 to 15 parts by mass relative to 10 parts by mass of the aluminum halide.

Examples of the halogenating agent include chlorine gas, sulfuryl chloride, bromine, and the like.

The halogenation temperature is preferably 10° C. to 170° C. and more preferably 30° C. to 140° C. Further, pressure may be applied for increasing the reaction rate. The reaction time is preferably 5 to 100 hours and more preferably 30 to 45 hours.

The melting method using two or more compounds in combination serving as the solvent for the halogenation is preferred because the content ratio of halogenated zinc phthalocyanine having a specific halogen atom composition in the produced halogenated zinc phthalocyanine can be arbitrarily controlled by adjusting the ratio between chloride, bromide, and iodine in the melt salt and by changing the amounts of chlorine gas, bromine, and iodine introduced and the reaction time.

The melting method is preferred for producing the halogenated zinc phthalocyanine because of excellent yield from the raw materials due to little decomposition of the raw materials during reaction, and because the reaction can be performed by an inexpensive apparatus without using strong acid.

The halogenated zinc phthalocyanine with a preferred halogen atom composition can be produced by optimizing the raw material charging method, the type and amount of the catalyst used, and the reaction temperature and the reaction time.

In any one of the production methods, the produced halogenated zinc phthalocyanine is precipitated by pouring the resultant mixture after the completion of reaction into water or an aqueous acid solution such as hydrochloric acid or the like. The produced halogenated zinc phthalocyanine may be used as it is or may be used after subsequent filtration or washing with water, sodium hydrogen sulfate water, sodium hydrogen carbonate water, or sodium hydroxide water, and if required, washing with an organic solvent such as acetone, toluene, methyl alcohol, ethyl alcohol, dimethyl formamide, or the like, and posttreatment such as drying or the like.

When the crude pigment is formed into a pigment, a resin (also referred to as a "coating resin" hereinafter) for coating the pigment for a color filter and a surfactant may be allowed to coexist. In forming the pigment, the coexistence of the coating resin and the surfactant may stabilize the active surfaces of particles (active growth surfaces) by the coating resin and the surfactant. Therefore, deviation of the particle growth direction is mitigated, and thus the pigment having a small average aspect ratio may be easily produced. In particular, the form in which the coating resin and the surfactant are allowed to coexist with the pigment for a color filter is referred to as a "pigment composition". In the pigment composition, the pigment for a color filter is preferably completely coated with the coating resin or the like, but a portion of the pigment may not be coated with the resin. In the method for producing the pigment for a color filter according to the embodiment, the contrast of a pixel portion may be improved by using the pigment composition.

A resin having an acid group, for example, a resin containing a polymer having an acid group, can be preferably used as the coating resin. The acid group exhibits interaction with the active surface (active growth surface), and thus the pigment containing primary particles having a small average aspect ratio can be easily produced by using the resin having an acid group. Examples of the acid group include a carboxyl group, a sulfonate group, a phosphate group, and ammonium bases thereof, and the like. Among these, a carboxyl group is preferred from the viewpoint that excellent contrast can be easily obtained. Like the coating resin, the surfactant is preferably an activator having an acid group.

The content of the pigment for a color filter in the pigment composition may be 85% by mass or more, 90% by mass or more, or 95% by mass or more based on the total mass of the resin composition. The content of the pigment for a color filter in the pigment composition may be 99% by mass or less, 98% by mass or less, or 96% by mass or less based on the total mass of the resin composition.

The pigment composition may contain a phthalocyanine derivative other than the pigment for a color filter and the coating resin. The phthalocyanine derivative may be added together with the crude pigment and the coating resin in a step of forming the pigment or may be added after the pigment for a color filter is produced. In addition, a yellow pigment described below in a pigment dispersion for a color filter may be added to the pigment composition.

<<Pigment Dispersion for Color Filter and Production Method Therefor>>

A pigment dispersion for a color filter according to an embodiment of the present invention contains the pigment for a color filter described above and a dispersant.

The pigment dispersion for a color filter can be produced by a known production method using the pigment for a color filter produced by the production method described above. The method for producing the pigment dispersion for a color filter according to the embodiment includes mixing the pigment for a color filter produced by the production method described above with the dispersant.

In preparing the pigment dispersion for a color filter, for example, the pigment for a color filter (the first pigment for a color filter and the second pigment for a color filter) produced by the production method described above is mixed with the dispersant and an organic solvent. Also, in order to form yellow pixels, the pigment dispersion for a color filter can further contain at least one or more yellow pigments together with the pigment for a color filter produced by the production method described above. More specifically, the dispersant, the yellow pigment, and the organic solvent are mixed to prepare a composition for toning, and the resultant composition can be adjusted to desired chromaticity (x, y) by mixing with the pigment dispersion for a color filter, which is produced by mixing the pigment for a color filter produced by the production method described above with the dispersant and the organic solvent.

(Dispersant)

Examples of the dispersant include DISPERBYK (DISPERBYK™) 130, 161, 162, 163, 170, LPN-6919, and LPN-21116 of BYK Chemie Co., Ltd., Efka 46 and Efka 47 of BASF Corp., and the like. A leveling agent, a coupling agent, a cationic surfactant, and the like may also be used.

(Yellow Pigment)

Examples of the yellow pigment include C. I. Pigment Yellow (PY) 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 126, 127, 128, 129, 138, 139, 150, 151, 152, 153, 154, 155, 156, 161, 162, 164, 166, 167, 168, 169, 170, 171, 172, 173, 174, 175, 176, 177, 179, 180, 181, 182, 185, 187, 19S, 231, and 233, and the like. In view of high luminance or suitability for thinning due to the need for only a small amount of the pigment, PY83, 138, 139, 150, 185, 231, or 233 is preferred, and PY138, 150, 185, 231, or 233 is particularly preferred. These can be used alone or in combination of two or more.

Specifically, one or a plurality of the following quinophthalone dimers (2-1), (2-2), (2-3), (2-4), (2-5), and (2-6) can be used as the yellow pigment.

[Chem. 2]
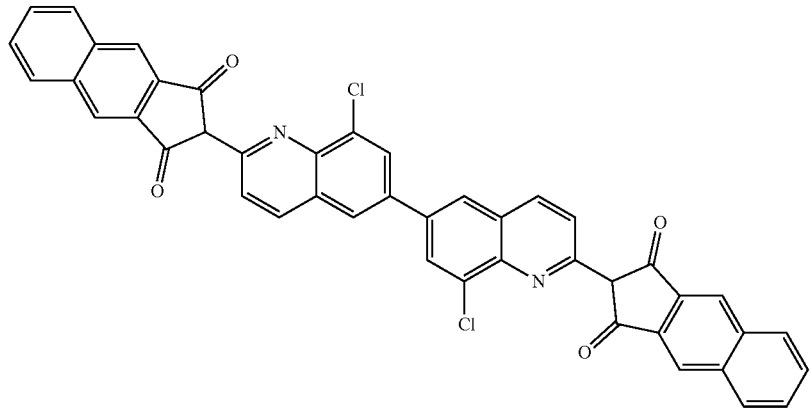
(2-1)
[Chem. 3]
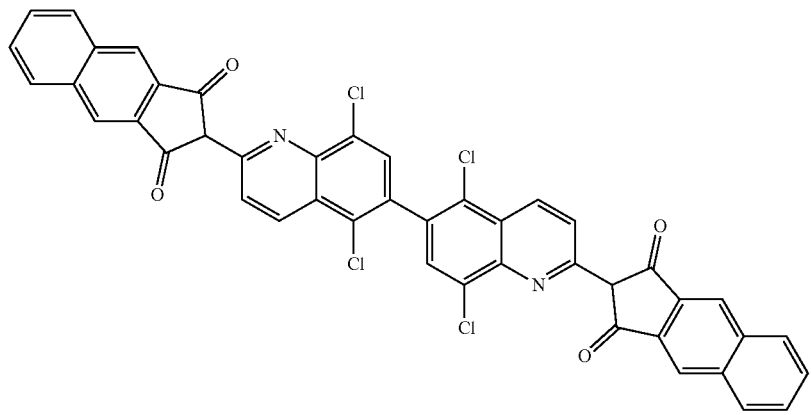
(2-2)
[Chem. 4]
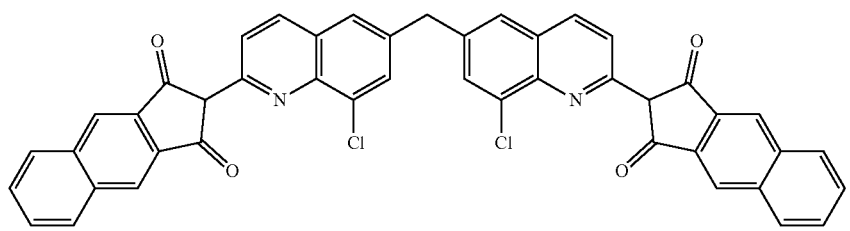
(2-3)
[Chem. 5]
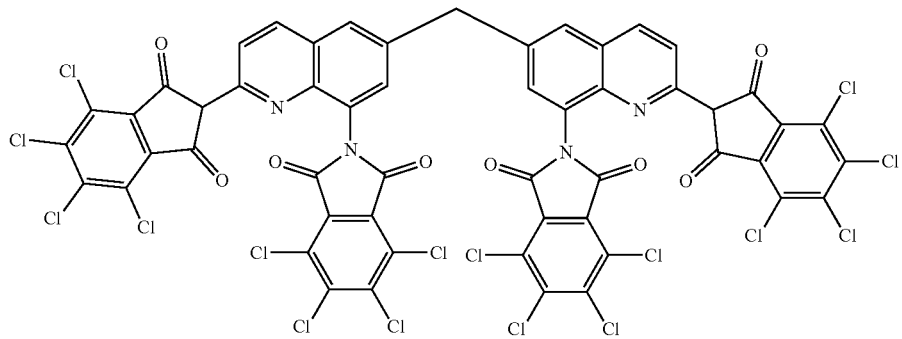
(2-4)

[Chem. 6]

(2-5)

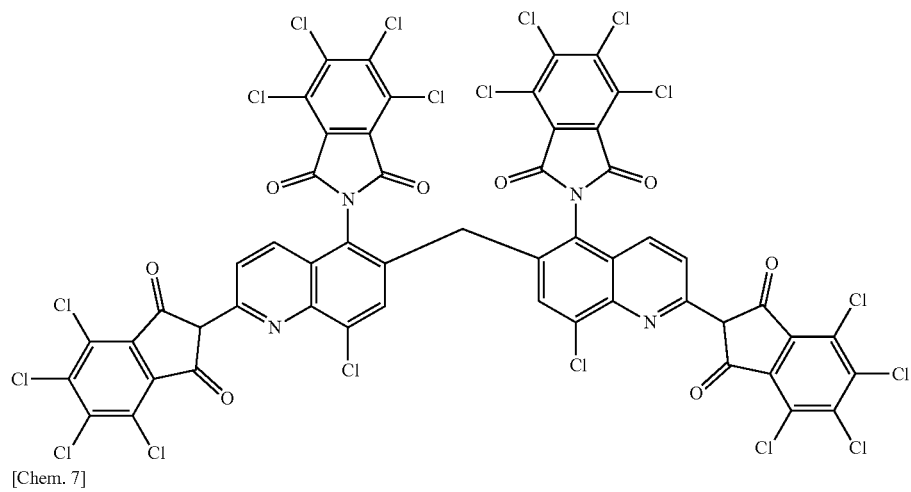

[Chem. 7]

(2-6)

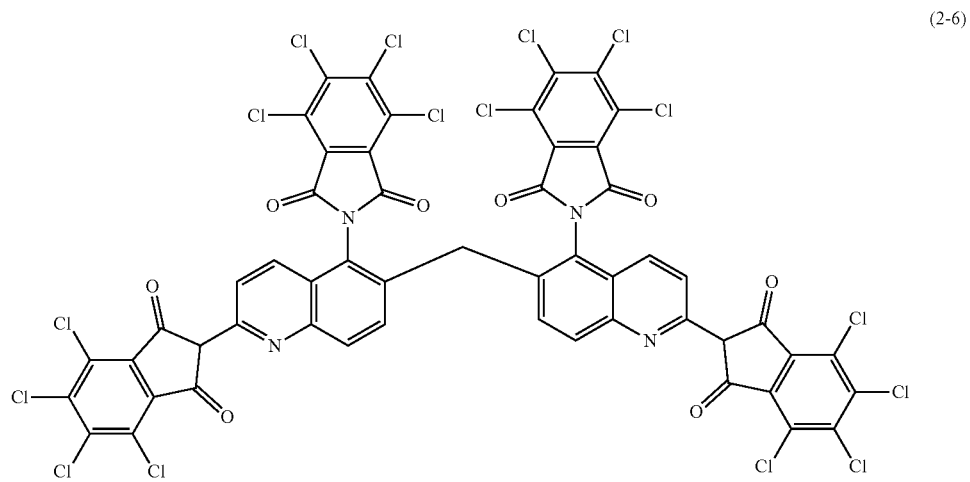

When the pigment dispersion is prepared by mixing the yellow pigment, the mixing ratio between the green pigment (the pigment for a color filter produced by the production method described above) and the yellow pigment may be 10 to 400 parts by mass of the yellow pigment relative to 100 parts by mass of the green pigment.

Also, even when the yellow pigment is combined for toning in the pigment dispersion of a color filter according to the embodiment, a bright color filter green pixel portion having little cloudiness and excellent color purity and coloring power can be formed as compared with a case using a usual green pigment.

(Organic Solvent)

Examples of the organic solvent include aromatic solvents such as toluene, xylene, methoxybenzene, and the like; acetate ester solvents such as ethyl acetate, butyl acetate, propylene glycol monomethyl ether acetate, propylene glycol monoethyl ether acetate, and the like; propionate solvents such as ethoxyethyl propionate and the like; alcohol solvents such as methanol, ethanol, and the like; ether solvents such as butyl cellosolve, propylene glycol monomethyl ether, diethylene glycol ethyl ether, diethylene glycol dimethyl ether, and the like; ketone solvents such as methyl ether ketone, methyl isobutyl ketone, cyclohexane, and the like; aliphatic hydrocarbon solvents such as hexane and the like; nitrogen compound-based solvents such as N,N-dimethyl fumaramide, γ-butyrolactam, N-methyl-2-pyrrolidone, aniline, pyridine, and the like; lactone-based solvents such as γ-butyrolactone and the like; carbamic acid esters such as a mixture of methyl carbamate and ethyl carbamate at 43:52 and the like; water; and the like. In particular, the organic solvent is preferably a water-soluble polar solvent such as a propionate-based, alcohol-based, ether-base, ketone-based, nitrogen compound-based, lactone-based solvent, water, or the like.

The average composition of the pigment dispersion for a color filter can be determined by, for example, X-fluorescence spectrometry or the like.

For example, the pigment dispersion for a color filter can be obtained as a dispersion liquid by stirring and dispersing 300 to 1000 parts by mass of the organic solvent and, if required, 0 to 100 parts by mass of the dispersant per 100 parts by mass of the pigment or pigment dispersion for a color filter so as to make the mixture uniform.

<<Curable Composition for Color Filter Green Pixel Portion and Method for Producing Color Filter>>

A curable composition for a color filter green pixel portion according to an embodiment of the present invention contains the pigment dispersion for a color filter and a curable resin.

The curable composition for a color filter green pixel portion can be prepared by a known method using the pigment for a color filter, the pigment composition, or the pigment dispersion for a color filter, which is produced by the production method described above. A method for producing a color filter according to an embodiment of the present invention includes mixing the pigment dispersion for a color filter produced by the production method described above with the curable resin to prepare the curable composition for a color filter green pixel portion and then applying the curable composition for a color filter green pixel portion on a transparent substrate.

<Method for Preparing Curable Composition for Color Filter Green Pixel Portion>

A method for preparing the curable composition for a color filter green pixel portion is generally a method of preparing a dispersion by using the pigment dispersion for a color filter produced by the production method and an organic solvent, and then adding the curable resin or the like to the resultant dispersion.

In preparing the curable composition for a color filter green pixel portion, for example, the pigment for a color filter produced by the production method, the curable resin, a photopolymerization initiator, and an organic solvent dissolving the resin are mixed. More specifically, the method generally includes preparing a dispersion by using the pigment dispersion for a color filter produced by the production method and the organic solvent, and then adding the curable resin or the like to the resultant dispersion.

The dispersant described above can be used as the dispersant.

A photosensitive composition for a color filter green pixel portion can be prepared by adding 3 to 20 parts by mass of the curable resin per 100 parts by mass of the pigment or pigment composition for a color filter and 0.05 to 3 parts by mass of the photopolymerization initiator per part by mass of the curable resin, and if required, the organic solvent, and then stirring and dispersing the resultant mixture to as to make it uniform.

Examples of the curable resin include thermoplastic resins such as a urethane resin, an acrylic resin, a polyamide acid resin, a polyimide resin, a styrene-maleic acid resin, a styrene-maleic anhydride resin, and the like; and photopolymerizable monomers such as difunctional monomers such as 1,6-hexanediol diacrylate, ethylene glycol diacrylate, neopentyl glycol diacrylate, triethylene glycol diacrylate, bis(acryloxyethoxy) bisphenol A, 3-methylpentanediol diacrylate, and the like; polyfunctional monomers such as trimethylolpropane triacrylate, pentaerythritol triacrylate, tris(2-hydroxyethyl)isocyanate, dipentaerythritol hexaacrylate, dipentaerythritol pentaacrylate, and the like.

Examples of the photopolymerization initiator include acetophenone, benzophenone, benzyl dimethyl ketal, benzoyl peroxide, 2-chlorothioxanthone, 1,3-bis(4'-azidobenzal)-2-propane, 1,3-bis(4'-azidobenzal))-2-propane-2'-sulfonic acid, 4,4'-diazidostilbene-2,2'-disulfonic acid, and the like.

The organic solvent described above can be used as the organic solvent.

<Method for Producing Color Filter>

A color filter can be produced by a known production method using the curable composition for a color filter green pixel portion prepared by the preparation method described above. A method for producing a color filter according to an embodiment of the present invention includes applying the curable composition for a color filter green pixel portion prepared by the preparation method to a transparent substrate.

The curable composition for a color filter green pixel portion can be used for forming a pattern of a color filter green pixel portion by a known method.

The method for producing a color filter is, for example, a method called "photolithography", in which the curable composition for a color filter green pixel portion containing the curable resin and the photopolymerization initiator is applied on a transparent substrate such as glass or the like by a spin coating method, a roll coating method, a slit coating method, an ink jet method, or the like, then the resultant coating film is pattern-exposed with ultraviolet light through a photomask, and then an unexposed portion is washed with a solvent or the like, forming a green pattern. After the curable composition for a color filter green pixel portion is pattern-exposed with ultraviolet light through a photomask, the unexposed portion is washed with an organic solvent, alkali water, or the like, whereby a color filter can be produced.

Other examples of the production method include a method for producing a color filter by forming a pattern of a green pixel portion by a method, such as an electrodeposition method, a transfer method, a micelle electrolytic method, a PVED (Photovoltaic Electrodeposition) method, or the like, and the like. Also, a red pixel portion pattern and a blue pixel portion pattern can be formed by the same method using known pigments.

Green pixels produced by the method for producing a color filter of the embodiment of the present invention have high color reproducibility and high luminance, and thus by using a color filter and a liquid crystal panel with high display performance including the green pixels, it is possible to produce a liquid crystal display device capable of satisfying a high coloring-power-region (high density region) in the color coordinates, such as the display standards of multimedia monitors, such as sRGB, AdobeRGB, DCI-P3, and the like, or the display standards such as NTSC, EBU, and the like.

The green pixel produced by the method for producing a color filter of the embodiment can well transmit green light of a light source, and can exhibit green color purity and coloring power to the maximum limit.

The light source may be, for example, a white LED (light emitting diode) light source, a white organic EL light source, a white inorganic EL light source, a white quantum-dot light source, or the like. When the light source is a white LED light source, examples which may be used as the white LED light source include a white LED light source emitting white light by mixing colors by combination of red LED, green LED, and blue LED, a white LED light source emitting white light by mixing colors by combination of blue LED, red LED, and a green phosphor, a white LED light source emitting white light by mixing colors by combination of blue LED, a red light-emitting phosphor, and a green light-emitting phosphor, a white LED light source emitting white light by mixing colors by combination of blue LED and a YAG phosphor, a white LED light source emitting white light by mixing colors by combination of ultraviolet LED, a red light-emitting phosphor, a green light-emitting phosphor, and a blue light-emitting phosphor, and a white LED light source combined with red laser, a white LED light source using quantum-dot technology, and the like.

A phosphor used in this field can be properly used as the phosphor. Examples of the phosphor which can be excited by blue LED or ultraviolet LED includes a cerium-activated yttrium-aluminum garnet-based phosphor (YAG:Ce), a cerium-activated lutetium-aluminum garnet-based phosphor (LAG:Ce), a europium and/or chromium-activated nitrogen-containing calcium aluminosilicate-based phosphor (for example, $CaO—Al_2O_3—SiO_2$:Eu), a europium-activated silicate-based phosphor (($Sr,Ba)_2SiO_4$:Eu), a sialon-based phosphor, nitride-based phosphors such as a CASN-based phosphor ($CaAlSiN_3$:Eu), a SCASN-based phosphor ((Sr, Ca) $AlSiN_3$:Eu), and the like, a KSF-based phosphor ($K_2SiF_6$:Mn), a sulfide-based phosphor, a quantum-dot phosphor, and the like.

More specifically, for example, a sialon-based phosphor sialon-based phosphor may be an α-type sialon phosphor. The α-type sialon phosphor may be an Eu ion-dissolved α-type sialon phosphor produced by, for example, mixing silicon nitride ($Si_3N_4$), aluminum nitride (AlN), calcium carbonate ($CaCO_3$), and europium oxide ($Eu_2O_3$) at a pre-determined molar ratio, and firing the resultant mixture by a hot press method of holding at a temperature of 1700° C. for 1 hour in nitrogen at 1 atom (0.1 MPa). The α-type sialon phosphor is a phosphor which emits yellow light at 550 to 600 nm by excitation with blue light at 450 to 500 nm. The sialon-based phosphor may be a β-type sialon phosphor having a β-$Si_3N_4$ structure. The β-type sialon phosphor is a phosphor which emits green to orange light at 500 to 600 nm by excitation with near-ultraviolet light to blue light.

The phosphor may also be, for example, an oxynitride phosphor including a JEM phase. The oxynitride phosphor emits light having a light emission peak at 460 to 510 nm by excitation with near-ultraviolet light to blue light.
(Other Applications)

The pigment for a color filter produced by the production method according to the embodiment develops green color with excellent contrast and high luminance. Therefore, the pigment for a color filter produced by the production method according to the embodiment and the pigment dispersion for a color filter prepared therefrom can be used for coloring a color filter for an image sensor, a coating material, a plastic, a printing ink, rubber, laser, printing, an electronic toner, a jet ink, a thermal transfer ink, and the like, besides the color filter detailed above.

EXAMPLES

The present invention is described in further detail below by giving examples and comparative examples, but the present invention is not limited to these examples etc. In addition, in Tables 2, 4, 6, and 8 below, a Raman shift value has an error of ±2.2 $cm^{-1}$ with respect to the described value.
[Average Particle Diameter of Primary Particle of Green Pigment]

A green pigment as a sample was ultrasonically dispersed in cyclohexane and then photographed by transmission electron microscope JEM-2010 manufactured by manufactured by JEOL, Ltd. With respect to a minimum-unit particle (that is, a primary particle) constituting an aggregate on a two-dimensional image, the long diameter (ferret diameter of the longest portion observed) and the short diameter (short ferret dimeter in a direction perpendicular to the ferret diameter of the longest portion) were measured, and an average value thereof was calculated as a primary particle diameter. The same operation was performed for 40 primary particles randomly selected, and by using an average value thereof, an average particle diameter of primary particles is calculated.

<Synthesis of Crude Pigment>

[Synthesis Example 1] (Water-Containing Crude Pigment WC1

In a 300-ml flask, 91 g of sulfuryl chloride (Fujifilm Wako Pure Chemical's reagent), 109 g of aluminum chloride (Kanto Chemical's reagent), 15 g of sodium chloride (Tokyo Chemical Industry's reagent), 30 g of zinc phthalocyanine manufactured by DIC Corporation, and 230 g of bromine (Fujifilm Wako Pure Chemical's reagent) were charged. The resultant mixture was heated to 130° C. and held at 130° C. for 40 hours. The mixture was taken out and placed in water and filtered, and then the residue was washed with water to produce a water-containing crude pigment WC1.

Then, 10 g of the water-containing crude pigment WC1 was dried at 90° C. for 14 hours to produce 4 g of a crude pigment C1. Mass spectrometry by JMS-S3000 manufactured by JEOL, Ltd. confirmed that the crude pigment C1 is halogenated zinc phthalocyanine having an average chlorine number of 1.8 and an average bromine number of 13.2. In addition, in mass spectrometry, the delay time was 500 ns, the laser intensity was 44%, and the resolving power value of the peak at m/z=1820 or more and 1860 or less was 31804.

[Synthesis Example 2] (Water-Containing Crude Pigment WC2

In a 300-ml flask, 90 g of sulfuryl chloride (Fujifilm Wako Pure Chemical's reagent), 105 g of aluminum chloride (Kanto Chemical's reagent), 14 g of sodium chloride (Tokyo Chemical Industry's reagent), 27 g of zinc phthalocyanine manufactured by DIC Corporation, and 55 g of bromine (Fujifilm Wako Pure Chemical's reagent) were charged. The resultant mixture was heated to 130° C. and held at 130° C. for 40 hours. The mixture was taken out and placed in water and filtered, and then the residue was washed with water to produce a water-containing crude pigment WC2.

Then, 10 g of the water-containing crude pigment WC2 was dried at 90° C. for 14 hours to produce 3 g of a crude pigment C2. Mass spectrometry by JMS-S3000 manufactured by JEOL, Ltd. confirmed that the crude pigment C2 is halogenated zinc phthalocyanine having an average chlorine number of 2.9 and an average bromine number of 9.3. In addition, in mass spectrometry, the delay time was 510 ns, the laser intensity was 40%, and the resolving power value of the peak at m/z=1820 or more and 1860 or less was 65086.
<Production of Pigment for Color Filter>

Production Example 1: Production of Green Pigment G1

In a 1-L autoclave, 75 g of the water-containing crude pigment WC1 was charged together with 525 g of water. The hydrogen ion index was adjusted to pH 5.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G1.

The green pigment G1 was ultrasonically dispersed in cyclohexane and then photographed by a transmission electron microscope, and the average particle diameter of primary particles was calculated from the average value of 40 of the primary particles constituting an aggregate in a two-dimensional image. The average particle diameter of the primary particles was 25 nm. In addition, the arithmetic standard deviation of a particle size distribution was calculated by the method and conditions described above using a dynamic light scattering particle size distribution analyzer. The arithmetic standard deviation of the particle size distribution was 19 nm.

Comparative Production Example 1: Production of Green Pigment G3

In a double arm kneader, 40 g of the crude pigment C1, 400 g of ground sodium chloride, and 63 of ethylene glycol were charged and then kneaded at 80° C. for 8 hours. After kneading, the mixture was taken out and placed in 2 kg of water at 80° C., stirred for 1 hour, and filtered, and then the residue was washed with hot water, dried, and ground to produce a green pigment G3.

The green pigment G3 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 34 nm. In addition, the arithmetic standard deviation of a particle size distribution was calculated by the method and conditions described above using a dynamic light scattering particle size distribution analyzer. The arithmetic standard deviation of the particle size distribution was 14 nm.

Production Example 2: Production of Green Pigment G5

In a 1-L autoclave, 75 g of the water-containing crude pigment WC1 was charged together with 525 g of water, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G5. The green pigment G5 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 26 nm. In addition, the arithmetic standard deviation of a particle size distribution was calculated by the method and conditions described above using a dynamic light scattering particle size distribution analyzer. The arithmetic standard deviation of the particle size distribution was 19 nm.

Production Example 3: Production of Green Pigment G6

In a 1-L autoclave, 75 g of the water-containing crude pigment WC1 was charged together with 525 g of water. The hydrogen ion index was adjusted to pH 2.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G6.

The green pigment G6 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 25 nm. In addition, the arithmetic standard deviation of a particle size distribution was calculated by the method and conditions described above using a dynamic light scattering particle size distribution analyzer. The arithmetic standard deviation of the particle size distribution was 18 nm.

Production Example 4: Production of Green Pigment G7

In a 1-L autoclave, 75 g of the water-containing crude pigment WC1 was charged together with 525 g of water. The hydrogen ion index was adjusted to pH 8.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G7.

The green pigment G7 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 25 nm. In addition, the arithmetic standard deviation of a particle size distribution was calculated by the method and conditions described above using a dynamic light scattering particle size distribution analyzer. The arithmetic standard deviation of the particle size distribution was 19 nm.

Production Example 5: Production of Green Pigment G8

In a 1-L autoclave, 75 g of the water-containing crude pigment WC1 was charged together with 525 g of water. The hydrogen ion index was adjusted to pH 11.5 by using an aqueous sodium hydroxide solution at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G8.

The green pigment G8 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 26 nm. In addition, the arithmetic standard deviation of a particle size distribution was calculated by the method and conditions described above using a dynamic light scattering particle size distribution analyzer. The arithmetic standard deviation of the particle size distribution was 18 nm.

Production Example 6: Production of Green Pigment G9

In a 1-L autoclave, 75 g of the water-containing crude pigment WC1 was charged together with 525 g of water. The hydrogen ion index was adjusted to pH 5.5 by using hydrochloric acid at a concentration of 5%, and the autoclave was filled with nitrogen gas and then closed. After closing, the pressure in the autoclave was 0.80 MPa. The crude pigment was heated to 50° C. over 2 hours under stirring and held at 50° C. for 5 hours. When the temperature reached 50° C., the pressure in the autoclave was 0.82 MPa. After allowing to cool to room temperature, filtration, hot-water washing, drying, and grinding were performed to produce a green pigment G9.

The green pigment G9 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 20 nm. In addition, the arithmetic standard deviation of a particle size distribution was calculated by the method and conditions described above using a dynamic light scattering particle size distribution analyzer. The arithmetic standard deviation of the particle size distribution was 15 nm.

Comparative Production Example 2: Production of Green Pigment G10

In a 1-L autoclave, 30 g of the green pigment G3 was charged together with 570 g of water. The hydrogen ion index was adjusted to pH 5.5 by using hydrochloric acid at a concentration of 5%, and then the autoclave was closed. The pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G10.

The green pigment G10 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 36 nm. In addition, the arithmetic standard deviation of a particle size distribution was calculated by the method and conditions described above using a dynamic light scattering particle size distribution analyzer. The arithmetic standard deviation of the particle size distribution was 14 nm.

<Production of Yellow Composition for Toning>
(Production of Yellow Composition for Toning (TY1))

In a paint shaker manufactured by Toyo Seiki Co., Ltd., 1.65 g of Pigment Yellow 138 (Chromofine Yellow 6206EC manufactured by Dainichi Seika Kogyo Co., Ltd.) was dispersed together with 3.85 g of DISPERBYK™-161 (manufactured by BYK Chemie Co., Ltd.) and 11.00 g of propylene glycol monomethyl ether acetate for 2 hours using zircon beads of 0.3 to 0.4 mm, preparing a dispersion.

To 4.0 g of the dispersion, 0.98 g of Unidic ZL-295, and 0.22 g of propylene glycol monomethyl ether acetate were added and mixed by a paint shaker, producing a yellow composition for toning (TY1).

(Production of Yellow Composition for Toning (TY2))

In a paint shaker manufactured by Toyo Seiki Co., Ltd., 1.65 g of Pigment Yellow 185 (Paliotol Yellow D1155 manufactured by BASF Corporation) was dispersed together with 3.85 g of DISPERBYK™-161 (manufactured by BYK Chemie Co., Ltd.) and 11.00 g of propylene glycol monomethyl ether acetate for 2 hours using zircon beads of 0.3 to 0.4 mm, preparing a dispersion.

To 4.0 g of the dispersion, 0.98 g of Unidic ZL-295, and 0.22 g of propylene glycol monomethyl ether acetate were added and mixed by a paint shaker, producing a yellow composition for toning (TY2).

<Production of Color Filter>

Example 1

In a paint shaker manufactured by Toyo Seiki Co., Ltd., 2.48 g of the green pigment G1 produced in Production Example 1 was dispersed together with 1.24 g of BYK-LPN6919 manufactured by BYK Chemie Co., Ltd.), 1.86 g of Unidic ZL-295 manufactured by DIC Corporation, and 10.92 g of propylene glycol monomethyl ether acetate for 2 hours using zircon beads of 0.3 to 0.4 mm, preparing a pigment dispersion for a color filter (MG1).

To 4.0 g of the pigment dispersion for a color filter (MG1), 0.98 g of Unidic ZL-295 manufactured by DIC Corporation and 0.22 g of propylene glycol monomethyl ether acetate were added and mixed by a paint shaker, producing a composition for evaluation (CG1) for forming a green pixel portion for a color filter.

Comparative Example 1

A pigment dispersion for a color filter (MG3) and a composition for evaluation (CG3) were produced by the same method as in Example 1 except that the green pigment G1 in Example 1 was changed to the green pigment G3 produced in Comparative Production Example 1.

Example 2

A pigment dispersion for a color filter (MG5) and a composition for evaluation (CG5) were produced by the same method as in Example 1 except that the green pigment G1 in Example 1 was changed to the green pigment G5 produced in Production Example 2.

Example 3

A pigment dispersion for a color filter (MG6) and a composition for evaluation (CG6) were produced by the same method as in Example 1 except that the green pigment G1 in Example 1 was changed to the green pigment G6 produced in Production Example 3.

Example 4

A pigment dispersion for a color filter (MG7) and a composition for evaluation (CG7) were produced by the same method as in Example 1 except that the green pigment G1 in Example 1 was changed to the green pigment G7 produced in Production Example 4.

Example 5

A pigment dispersion for a color filter (MG7) and a composition for evaluation (CG3) were produced by the same method as in Example 1 except that the green pigment G1 in Example 1 was changed to the green pigment G8 produced in Production Example 5.

Example 6

A pigment dispersion for a color filter (MG9) and a composition for evaluation (CG9) were produced by the same method as in Example 1 except that the green pigment G1 in Example 1 was changed to the green pigment G9 produced in Production Example 6.

Comparative Example 2

A pigment dispersion for a color filter (MG10) and a composition for evaluation (CG10) were produced by the same method as in Example 1 except that the green pigment G1 in Example 1 was changed to the green pigment G10 produced in Comparative Production Example 2.

<Luminance Measurement>

A coating solution prepared by mixing each of the compositions for evaluation (CG1, CG3, and CG5 to CG10) prepared in Examples 1 to 6 and Comparative Examples 1 and 2 with the yellow composition for toning (TY1) was spin-coated on a soda glass substrate, dried at 90° C. for 3 minutes, and then heated at 230° C. for 1 hour. Thus, a glass substrate for luminance evaluation having a colored film on the soda glass substrate was formed. In forming the colored film by heating at 230° C. for 1 hour, the colored film was formed to have chromaticity (x, y) of (0.275, 0.570) with a C light source by adjusting the mixing ratio of the yellow composition for toning (TY1) to each of the compositions for evaluation (CG1, CG3, and CG5 to CG10), and the spin rotational speed during spin coating. The luminance of the colored film on the glass substrate for luminance measurement was measured by U-3900 manufactured by Hitachi High-Tech Science Corporation.

Table 1 shows the results of luminance evaluation of Examples 1 to 6 and Comparative Examples 1 and 2. In Table 1, the luminance is shown as a relative value when the value of luminance of the composition for evaluation (CG3) of Comparative Example 1 is regarded as 100%.

TABLE 1

| | Crude pigment | Green pigment | Pigment formation method | Adjustment of hydrogen ion index | Luminance |
|---|---|---|---|---|---|
| Example 1 | WC1 | G1 | Heating | pH 5.5 | 105.0% |
| Comparative Example 1 | C1 | G3 | Kneader | — | 100% |
| Example 2 | WC1 | G5 | Heating | No | 104.8% |
| Example 3 | WC1 | G6 | Heating | pH 2.5 | 105.0% |
| Example 4 | WC1 | G7 | Heating | pH 8.5 | 105.0% |
| Example 5 | WC1 | G8 | Heating | pH 11.5 | 104.6% |
| Example 6 | WC1 | G9 | Pressure application | pH 5.5 | 104.5% |
| Comparative Example 2 | C1→G3 | G10 | Kneader + heating | pH 5.5 | 100.5% |

The results of Table 1 indicate that color filters formed in Examples 1 to 6 using the green pigments G1 and G5 to G9, formed by pressure-heating the water-containing crude pigment WC1, have high luminance as compared with a color filter formed in Comparative Example 1 using the green pigment G3 formed by grinding, with a kneader, the crude pigment C1. In addition, a color filter formed in Comparative Example 2 using the green pigment G10 formed by again pressure-grinding the green pigment G3 formed by grinding, with a kneader, the crude pigment C1 has substantially the same degree of luminance as the color filter of Comparative Example 1. The color filters of Examples 1, 3, and 4 in which the hydrogen ion index was adjusted to pH 2.5 to pH 8.5 during pressure-heating are more excellent in luminance.

Measurement of Raman Spectrum>

The Raman spectrum of each of the green pigments G1, G3, and G5 to G10 formed in Examples 1 to 6 and Comparative Examples 1 and 2 was measured under the conditions and spectral treatment below using a microscopic Raman spectrometer (NRS-5500 manufactured by JASCO Corporation).

[Apparatus Condition]

Setting of microscope: objective lens 100 times (MPLFLN 100×), confocal aperture 4000 μmϕ

Setting for spectrometer: focal distance 300 mm, diffraction grading 1800 Line/mm, slit width 100 Mm×1000 μm Wavenumber resolution: 4.21 cm$^{-1}$ (0.67 cm$^{-1}$/pixel)

Wavenumber calibration: the apparatus is calibrated with 520±1 cm$^{-1}$ by using a Si crystal Light source: laser light source with a wavelength of 531.98 nm Each of the spectra was measured under irradiation with a Ne lamp as an internal standard, and corrected by using a bright line of the Ne lamp (wavenumber in vacuum: 18511.447 cm$^{-1}$ [Raman Shift=281 cm$^{-1}$])

[Measurement Condition]

Wavenumber range: 1100 to 100 cm$^{-1}$, exposure time: 30 sec, number of times of integration: 20

[Spectral Treatment]

By using a software attached to the apparatus, the following corrections were made: (i) correction of a baseline rise due to fluorescence or the like (base line correction), (ii) correction so that the wavenumber intervals of a spectrum after correction became equal intervals (0.5 cm$^{-1}$) (equal interval treatment), and (iii) correction for removing minute noise (Savitzky-Golay filter: 11 pt). Also, (iv) the detected intensity was normalized by using a peak at 650±10 cm$^{-1}$. The results are shown in Table 2.

TABLE 2

| | Relative intensity when peak intensity at 650 cm$^{-1}$ is regarded as 100% | | |
|---|---|---|---|
| | 321 cm$^{-1}$ | 328 cm$^{-1}$ | 716 cm$^{-1}$ |
| Example 1 | 9.4% | 6.4% | 6.0% |
| Comparative Example 1 | 14.2% | 3.8% | 2.4% |
| Example 2 | 9.4% | 5.9% | 5.7% |
| Example 3 | 9.2% | 5.3% | 4.8% |
| Example 4 | 9.7% | 5.9% | 5.8% |
| Example 5 | 9.9% | 6.0% | 6.0% |
| Example 6 | 9.6% | 6.3% | 6.1% |
| Comparative Example 2 | 13.2% | 2.9% | 1.0% |

The results of Table 2 indicate that any one of the pigments for a color filter formed in Examples 1 to 6 using the green pigments G1 and G5 to G9, formed by pressure-heating the water-containing crude pigment WC1, shows a relative intensity of 4.3% or more near a Raman shift of 716 cm$^{-1}$ when the peak intensity at a Raman shift of 650±10 cm$^{-1}$ is regarded as 100%.

On the other hand, the pigment for a color filter formed in Comparative Example 1 using the green pigment G3 formed by grinding, with a kneader, the crude pigment C1 shows a relative intensity of 2.4% near a Raman shift of 716 cm$^{-1}$ and thus shows lower relative intensity than Examples 1 to 6. In addition, the pigment for a color filter formed in Comparative Example 2 using the green pigment G10, formed by again pressure-grinding the green pigment G3 formed by grinding, with a kneader, the crude pigment C1, shows a relative intensity of 1.0% near a Raman shift of 716 cm$^{-1}$ and thus, like in Comparative Example 1, shows lower relative intensity than Examples 1 to 6.

Also, any one of the pigments for a color filter in Examples 1 to 6 shows a relative intensity of 5.3% or more at a Raman shift of 326 cm$^{-2}$. On the other hand, the pigment for a color filter in Comparative Example 1 shows a relative intensity of 3.3% at a Raman shift of 328 cm$^{-1}$ and thus shows lower relative intensity than Examples 1 to 6. In addition, the pigment for a color filter in Comparative Example 2 shows a relative intensity of 2.9% at a Raman shift of 328 cm$^{-1}$ and thus, like in Comparative Example 1, shows lower relative intensity than Examples 1 to 6.

Further, any one of the pigments for a color filter in Examples 1 to 6 shows a relative intensity of 9.9% or less near a Raman shift of 321 cm$^{-1}$. On the other hand, the pigment for a color filter in Comparative Example 1 shows a relative intensity of 14.2% near a Raman shift of 321 cm$^{-1}$ and thus shows higher relative intensity than Examples 1 to 6. In addition, the pigment for a color filter in Comparative Example 2 shows a relative intensity of 13.2% near a Raman shift of 321 cm$^{-1}$ and thus, like in Comparative Example 1, shows higher relative intensity than in Examples 1 to 6.

Figure 2:
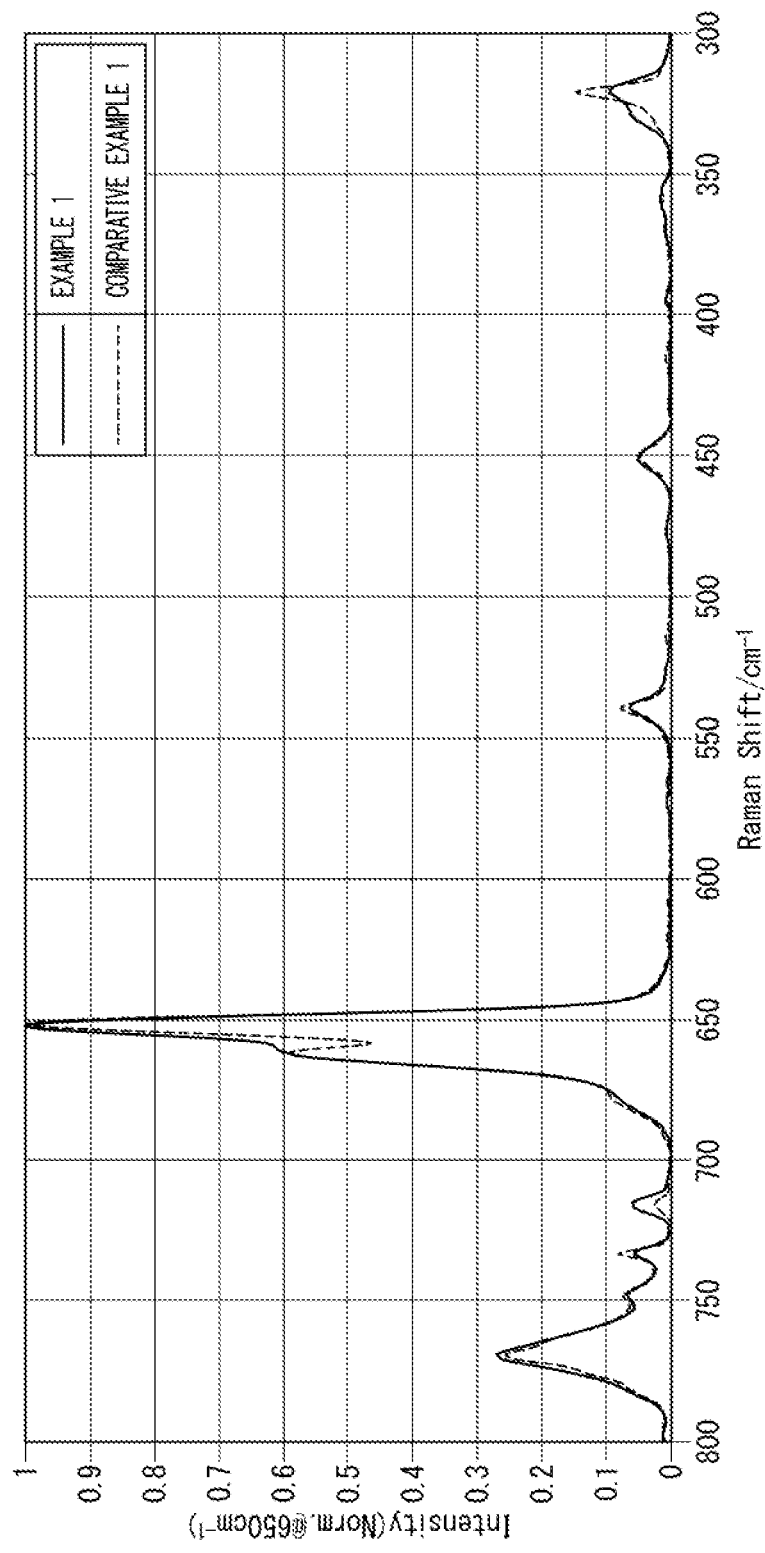
FIG. 2 is a diagram showing Raman spectra obtained in Example 1 and Comparative Example 1.
Figure 3:
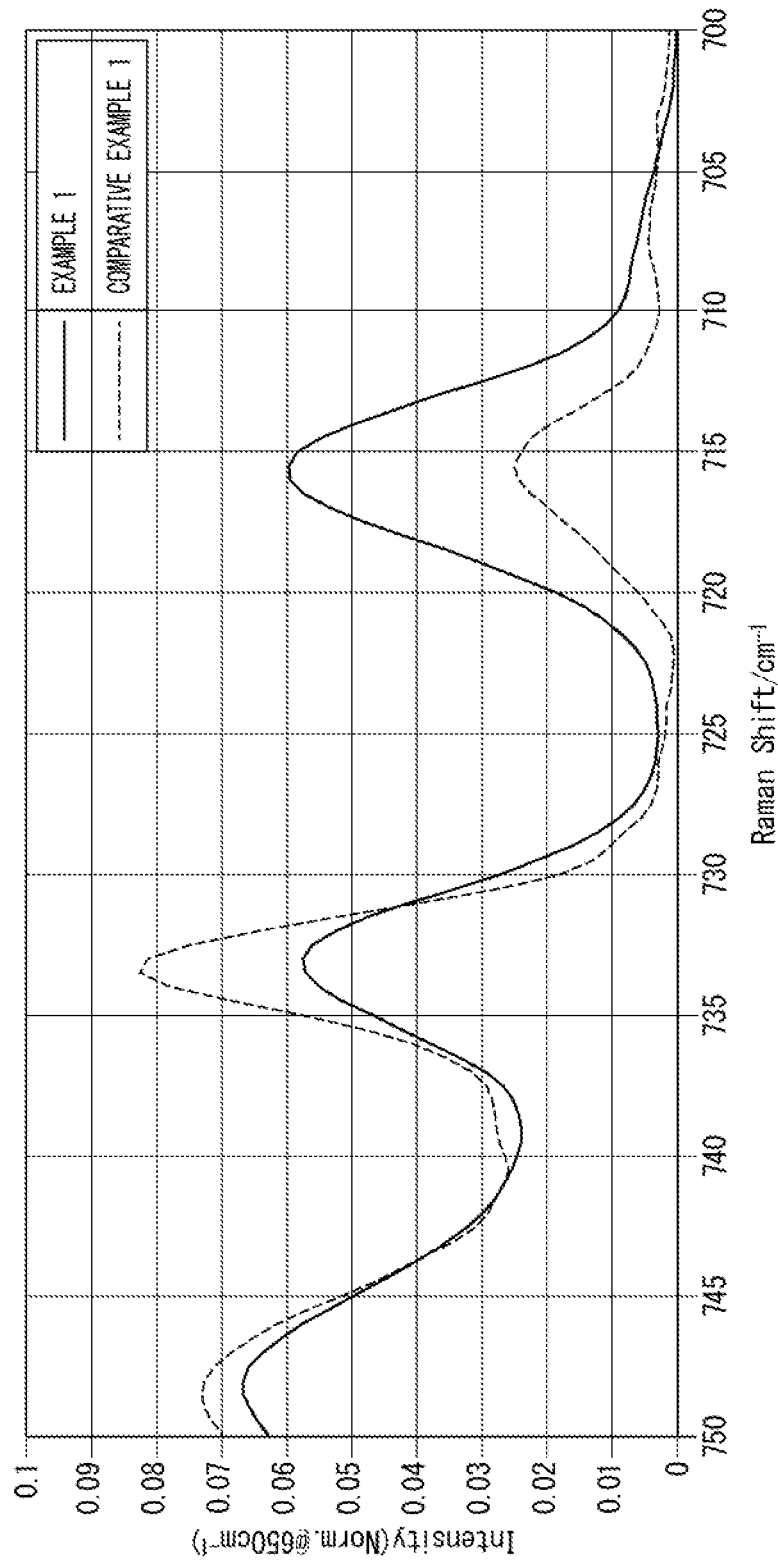
FIG. 3 is an enlarged diagram of the Raman spectra at a Raman shift of 700 cm$^{-1}$ to 750 cm$^{-1}$ in FIG. 2.
Figure 4:
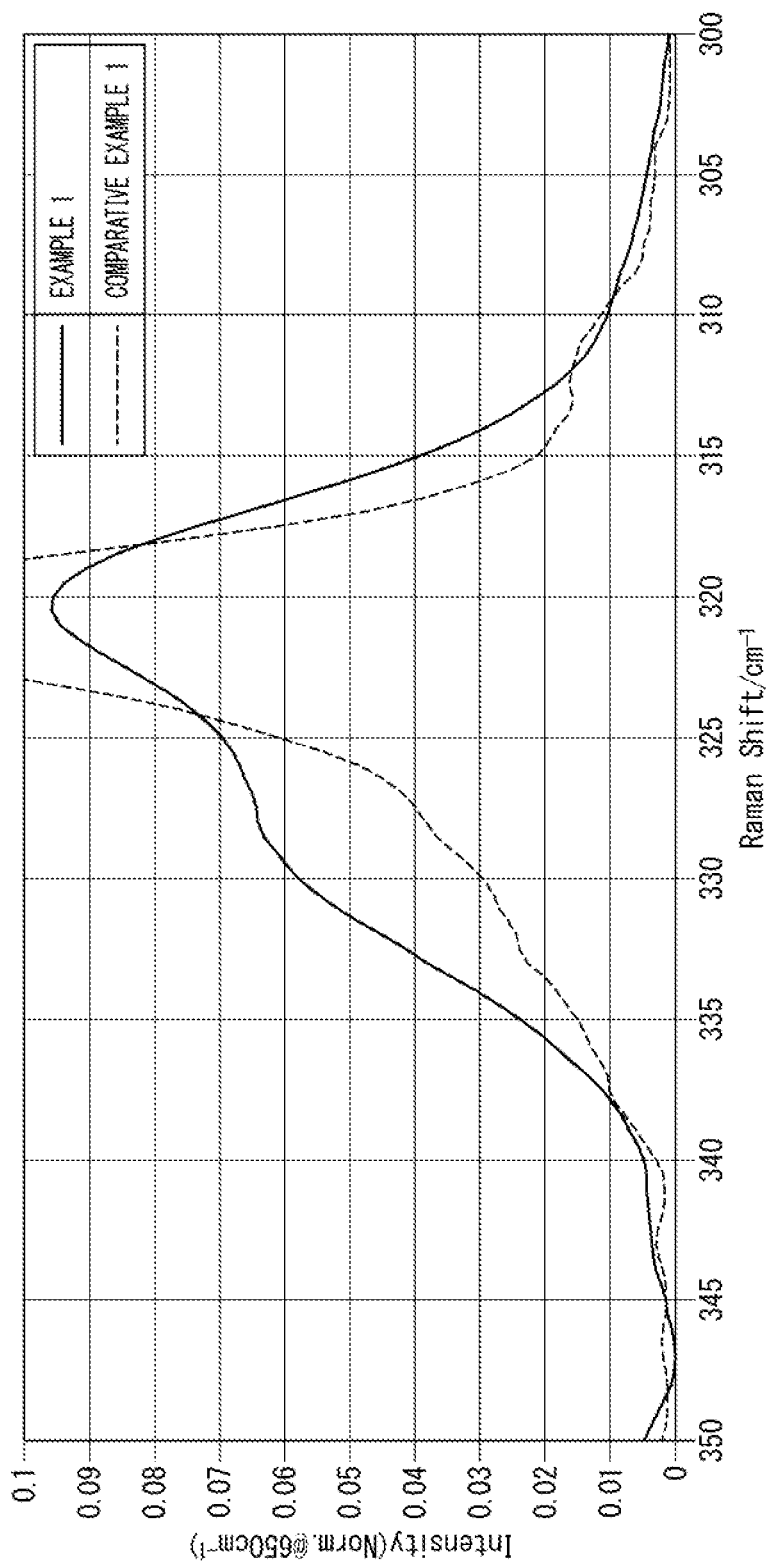
FIG. 4 is an enlarged diagram of the Raman spectra at a Raman shift of 300 cm$^{-1}$ to 350 cm$^{-1}$ in FIG. 2.

As a representative, FIG. 2 shows the Raman spectra obtained in Example 1 and Comparative Example 1, FIG. 3 is an enlarged diagram at a Raman shift of 700 cm$^{-1}$ to 750 cm$^{-1}$, and FIG. 4 is an enlarged diagram at a Raman shift of 300 cm$^{-1}$ to 350 cm$^{-1}$. As shown in FIG. 2 to FIG. 4, it was found that the pigment for a color filter in Example 1 shows, near a Raman shift of 716 cm$^{-1}$, a relative intensity of as high as about 2.5 times the relative intensity near a Raman shift of 716 cm$^{-1}$ in Comparative Example 1 when the peak intensity at a Raman shift of 650±10 cm$^{-1}$ is regarded as 100%. It was also found that the pigment for a color filter in Example 1 shows, at a Raman shift of 328 cm$^{-1}$, a relative intensity of as high as about 1.7 times the relative intensity at a Raman shift of 328 cm$^{-1}$ in Comparative Example 1. It was further found that the pigment for a color filter in Example 1 shows, near a Raman shift of 321 cm$^{-1}$, a relative intensity of about ⅔ times the relative intensity near a Raman shift of 321 cm$^{-1}$ in Comparative Example 1.

<Production of Pigment for Color Filter>

Production Example 7: Production of Green Pigment G2

In a 1-L autoclave, 100 g of the water-containing crude pigment WC2 was charged together with 500 g of water. The hydrogen ion index was adjusted to pH 5.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G2.

The green pigment G2 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 28 nm. In addition, the arithmetic standard deviation of a particle size distribution was calculated by the method and conditions described above using a dynamic light scattering particle size distribution analyzer. The arithmetic standard deviation of the particle size distribution was 24 nm.

Comparative Production Example 3: Production of Green Pigment G4

In a double arm kneader, 40 g of the crude pigment C2, 400 g of ground sodium chloride, and 63 g of diethylene glycol were charged and then kneaded at 80° C. for 8 hours. After kneading, the mixture was taken out and placed in 2 kg of water at 80° C., stirred for 1 hour, and then filtered, and the residue was washed with hot water, dried, and ground to produce a green pigment G4.

The green pigment G4 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 31 nm. In addition, the arithmetic standard deviation of a particle size distribution was calculated by the method and conditions described above using a dynamic light scattering particle size distribution analyzer. The arithmetic standard deviation of the particle size distribution was 35 nm.

Production Example 8: Production of Green Pigment G11

In a 1-L autoclave, 100 g of the water-containing crude pigment WC2 was charged together with 500 g of water, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G11.

The green pigment G11 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 27 nm. In addition, the arithmetic standard deviation of a particle size distribution was calculated by the method and conditions described above using a dynamic light scattering particle size distribution analyzer. The arithmetic standard deviation of the particle size distribution was 24 nm.

Production Example 9: Production of Green Pigment G12

In a 1-L autoclave, 100 g of the water-containing crude pigment WC2 was charged together with 500 g of water. The hydrogen ion index was adjusted to pH 2.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G12.

The green pigment G12 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 23 nm. In addition, the arithmetic standard deviation of a particle size distribution was calculated by the method and conditions described above using a dynamic light scattering particle size distribution analyzer. The arithmetic standard deviation of the particle size distribution was 21 nm.

Production Example 10: Production of Green Pigment G13

In a 1-L autoclave, 100 g of the water-containing crude pigment WC2 was charged together with 500 g of water. The hydrogen ion index was adjusted to pH 8.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G13.

The green pigment G13 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 27 nm. In addition, the arithmetic standard deviation of a particle size distribution was calculated by the method and conditions described above using a dynamic light scattering particle size distribution analyzer. The arithmetic standard deviation of the particle size distribution was 23 nm.

Production Example 11: Production of Green Pigment G14

In a 1-L autoclave, 100 g of the water-containing crude pigment WC2 was charged together with 500 g of water. The hydrogen ion index was adjusted to pH 11.5 by using an aqueous sodium hydroxide solution at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G14.

The green pigment G14 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 23 nm. In addition, the arithmetic standard deviation of a particle size distribution was calculated by the method and conditions described above using a dynamic light scattering particle size distribution analyzer. The arithmetic standard deviation of the particle size distribution was 21 nm.

Production Example 12: Production of Green Pigment G15

In a 1-L autoclave, 100 g of the water-containing crude pigment WC2 was charged together with 500 g of water. The hydrogen ion index was adjusted to pH 5.5 by using hydrochloric acid at a concentration of 5%, and the autoclave was filled with nitrogen gas and was then closed. After closing, the pressure in the autoclave was 0.80 MPa. The crude pigment was heated to 50° C. over 2 hours under stirring and held at 50° C. for 5 hours. When the temperature reached 50° C., the pressure in the autoclave was 0.82 MPa. After allowing to cool to room temperature, filtration, hot-water washing, drying, and grinding were performed to produce a green pigment G15.

The green pigment G15 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 26 nm. In addition, the arithmetic standard deviation of a particle size distribution was calculated by the method and conditions described above using a dynamic light scattering particle size distribution analyzer. The arithmetic standard deviation of the particle size distribution was 20 nm.

Comparative Production Example 4: Production of Green Pigment G16

In a 1-L autoclave, 30 g of the green pigment G4 was charged together with 570 g of water. The hydrogen ion index was adjusted to pH 5.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G16.

The green pigment G16 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 33 nm. In addition, the arithmetic standard deviation of a particle size distribution was calculated by the method and conditions described above using a dynamic light scattering particle size distribution analyzer. The arithmetic standard deviation of the particle size distribution was 34 nm.

<Production of Color Filter>

Example 7

In a paint shaker manufactured by Toyo Seiki Co., Ltd., 2.48 g of the green pigment G2 was dispersed together with 1.24 g of BYK-LPN691S manufactured by BYK Chemie Co., Ltd.), 1.86 g of Unidic ZL-295 manufactured by DIC Corporation, and 10.92 g of propylene glycol monomethyl ether acetate for 2 hours using zircon beads of 0.3 to 0.4 mm, preparing a pigment dispersion for a color filter (MG2).

To 4.0 g of the pigment dispersion for a color filter (MG2), 0.98 g of Unidic ZL-295 manufactured by DIC Corporation, and 0.22 g of propylene glycol monomethyl ether acetate were added and mixed by a paint shaker, producing a composition for evaluation (CG2) for forming a green pixel portion for a color filter.

Comparative Example 3

A pigment dispersion for a color filter (MG4) and a composition for evaluation (CG4) were produced by the same method as in Example 7 except that the green pigment G2 in Example 7 was changed to the green pigment G4 produced in Comparative Production Example 3.

Example 8

A pigment dispersion for a color filter (MG11) and a composition for evaluation (CG11) were produced by the same method as in Example 7 except that the green pigment G2 in Example 7 was changed to the green pigment G11 produced in Production Example 8.

Example 9

A pigment dispersion for a color filter (MG12) and a composition for evaluation (CG12) were produced by the same method as in Example 7 except that the green pigment G2 in Example 7 was changed to the green pigment G12 produced in Production Example 9.

Example 10

A pigment dispersion for a color filter (MG13) and a composition for evaluation (CG13) were produced by the same method as in Example 7 except that the green pigment G2 in Example 7 was changed to the green pigment G13 produced in Production Example 10.

Example 11

A pigment dispersion for a color filter (MG14) and a composition for evaluation (CG14) were produced by the same method as in Example 7 except that the green pigment G2 in Example 7 was changed to the green pigment G14 produced in Production Example 11.

Example 12

A pigment dispersion for a color filter (MG15) and a composition for evaluation (CG15) were produced by the same method as in Example 7 except that the green pigment G2 in Example 7 was changed to the green pigment G15 produced in Production Example 12.

Comparative Example 4

A pigment dispersion for a color filter (MG16) and a composition for evaluation (CG16) were produced by the same method as in Example 7 except that the green pigment G2 in Example 7 was changed to the green pigment G16 produced in Comparative Production Example 4.

<Luminance Measurement>

A coating solution prepared by mixing the yellow composition for toning (TY2) with each of the compositions for evaluation (CG2, CG4, and CG11 to CG16), which were produced as described above, was spin-coated on a soda glass substrate, dried at 90° C. for 3 minutes, and then heated at 230° C. for 1 hour. Thus, a glass substrate for luminance evaluation having a colored film on the soda glass substrate was formed. In forming the colored film by heating at 230° C. for 1 hour, the colored film was formed to have chromaticity (x, y) of (0.230, 0.670) with a C light source by adjusting the mixing ratio of the yellow composition for toning (TY2) to each of the compositions for evaluation (CG2, CG4, and CG11 to CG16), and the spin rotational speed during spin coating. The luminance of the colored film on the glass substrate for luminance measurement was measured by U-3900 manufactured by Hitachi High-Tech Science Corporation.

Table 3 shows the results of luminance evaluation of Examples 7 to 12 and Comparative Examples 3 and 4. In Table 3, the luminance is shown as a relative value when the value of luminance of the composition for evaluation (CG4) of Comparative Example 3 is regarded as 100%.

TABLE 3

| | Crude pigment | Green pigment | Pigment formation method | Adjustment of hydrogen ion index | Luminance |
|---|---|---|---|---|---|
| Example 7 | WC2 | G2 | Heating | pH 5.5 | 102.0% |
| Comparative Example 3 | C2 | G4 | Kneader | — | 100% |
| Example 8 | WC2 | G11 | Heating | No | 101.6% |
| Example 9 | WC2 | G12 | Heating | pH 2.5 | 102.3% |
| Example 10 | WC2 | G13 | Heating | pH 8.5 | 102.0% |
| Example 11 | WC2 | G14 | Heating | pH 11.5 | 102.1% |
| Example 12 | WC2 | G15 | Pressure application | pH 5.5 | 101.7% |
| Comparative Example 4 | C2→G4 | G16 | Kneader + heating | pH 5.5 | 100.1% |

The results of Table 3 indicate that a color filters formed in Examples 7 to 12 using the green pigments G2 and G11 to G15, formed by pressure-heating the water-containing crude pigment WC2, have high luminance as compared with a color filter formed in Comparative Example 3 using the green pigment G4 formed by grinding, with a kneader, the crude pigment G2. In addition, a color filter formed in Comparative Example 4 using the green pigment G16, formed by again pressure-grinding the green pigment G4 formed by grinding, with a kneader, the crude pigment C2, has substantially the same degree of luminance as the color filter of Comparative Example 3. The color filters of Examples 7, 9, 10, and 11 in which the hydrogen ion index was adjusted to pH 2.5 to pH 11.5 during pressure-heating are more excellent in luminance.

<Measurement of Raman Spectrum>

The Raman spectrum of each of the green pigments (G2, G4, and G11 to G16) formed in Examples 7 to 12 and Comparative Examples 3 and 4 was measured by the same method as in Example 1. The results are shown in Table 4.

TABLE 4

| | Relative intensity when peak intensity at 650 cm$^{-1}$ is regarded as 100% | |
|---|---|---|
| | 328 cm$^{-1}$ | 713 cm$^{-1}$ |
| Example 7 | 3.1% | 1.9% |
| Comparative Example 3 | 2.2% | 1.0% |
| Example 8 | 3.1% | 2.0% |
| Example 9 | 3.4% | 2.3% |
| Example 10 | 3.0% | 1.9% |
| Example 11 | 3.0% | 1.9% |
| Example 12 | 3.2% | 2.2% |
| Comparative Example 4 | 2.0% | 0.9% |

The results of Table 4 indicate that any one of the pigments for a color filter formed in Examples 7 to 12 using the green pigments G2 and G11 to G15, formed by pressure-heating the water-containing crude pigment WC2, shows a relative intensity of 1.9% or more near a Raman shift of 713 cm$^{-1}$ when the peak intensity at a Raman shift of 650±10 cm$^{-1}$ is regarded as 100%.

On the other hand, the pigment for a color filter formed in Comparative Example 3 using the green pigment G4 formed by grinding, with a kneader, the crude pigment G2 shows a relative intensity of 1.0% near a Raman shift of 713 cm$^{-1}$ and thus shows lower relative intensity than Examples 7 to 12. In addition, the pigment for a color filter formed in Comparative Example 4 using the green pigment G16, formed by again pressure-grinding the green pigment G4 formed by grinding, with a kneader, the crude pigment C2, shows a relative intensity of 0.9% near a Raman shift of 713 cm$^{-1}$ and thus, like in Comparative Example 1, shows lower relative intensity than Examples 7 to 12.

Also, any one of the pigments for a color filter in Examples 7 to 12 shows a relative intensity of 3.0% or more near a Raman shift of 328 cm$^{-1}$. On the other hand, the pigment for a color filter in Comparative Example 3 shows a relative intensity of 2.2% near a Raman shift of 328 cm$^{-1}$ and thus shows lower relative intensity than Examples 7 to 12. In addition, the pigment for a color filter in Comparative Example 4 shows a relative intensity of 2.0% near a Raman shift of 328 cm$^{-1}$ and thus, like in Comparative Example 1, shows lower relative intensity than in Examples 7 to 12.

Figure 5:
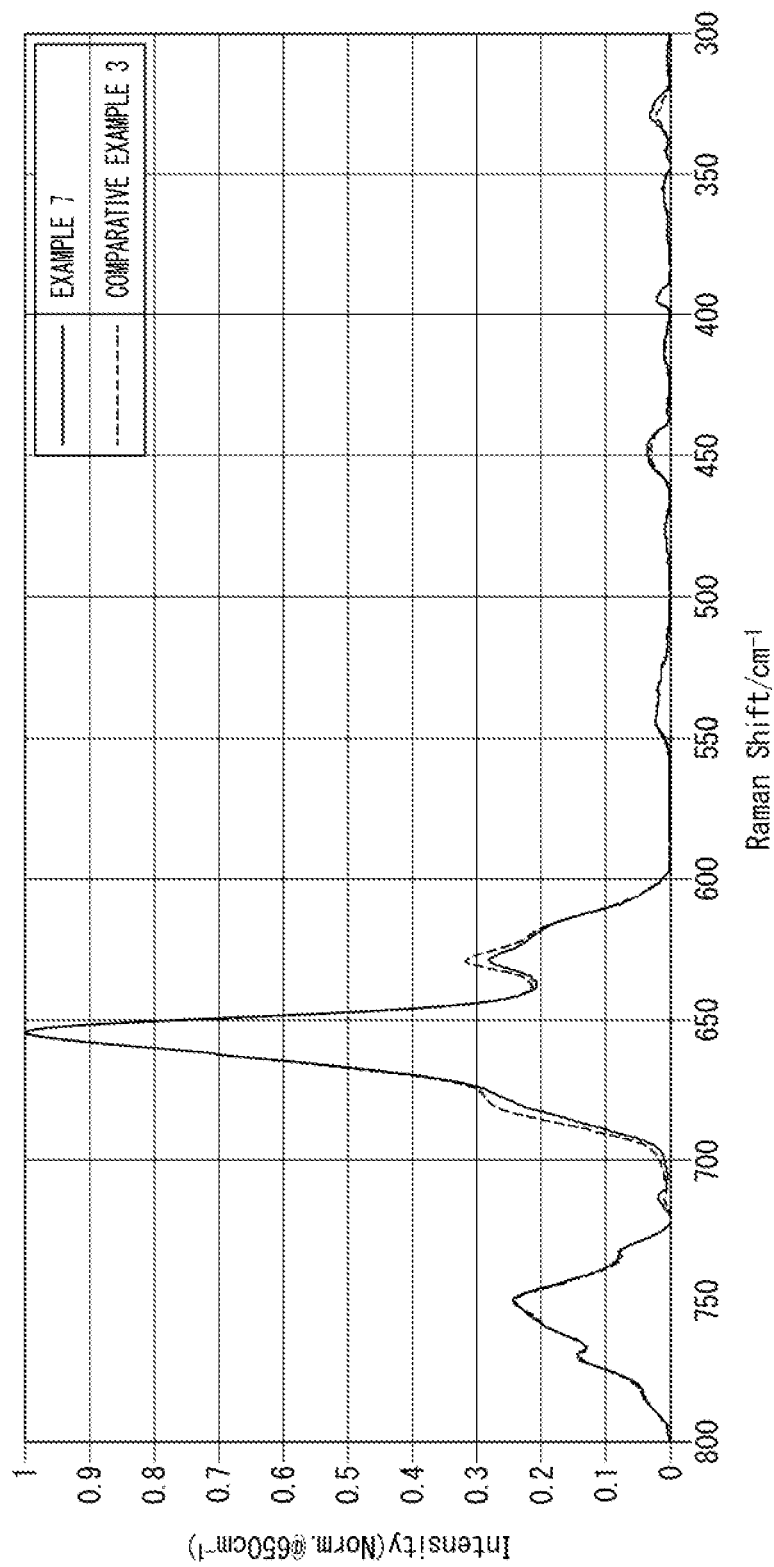
FIG. 5 is a diagram showing Raman spectra obtained in Example 7 and Comparative Example 3.
Figure 6:
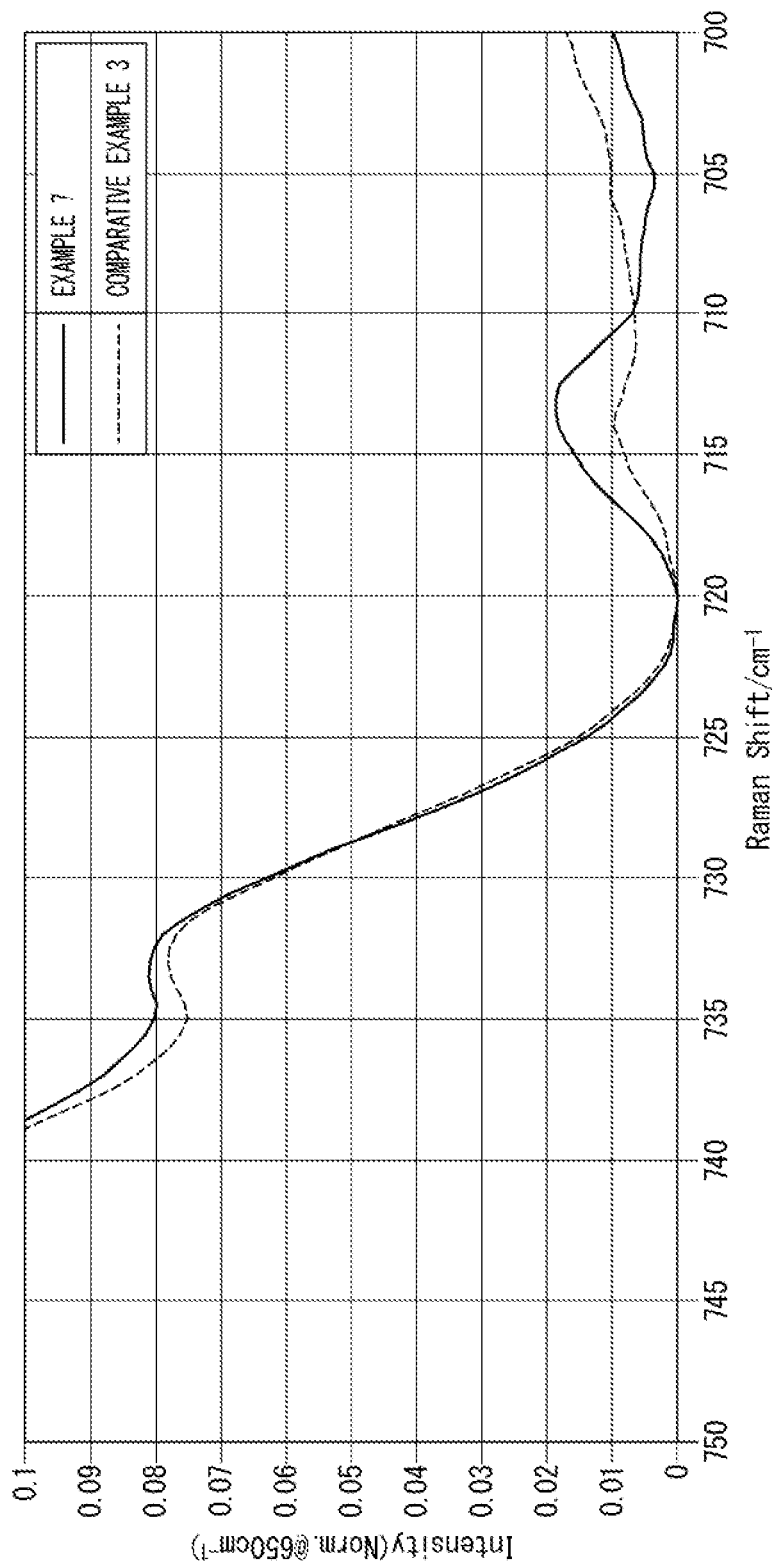
FIG. 6 is an enlarged diagram of the Raman spectra at a Raman shift of 700 cm$^{-1}$ to 750 cm$^{-1}$ in FIG. 5.
Figure 7:
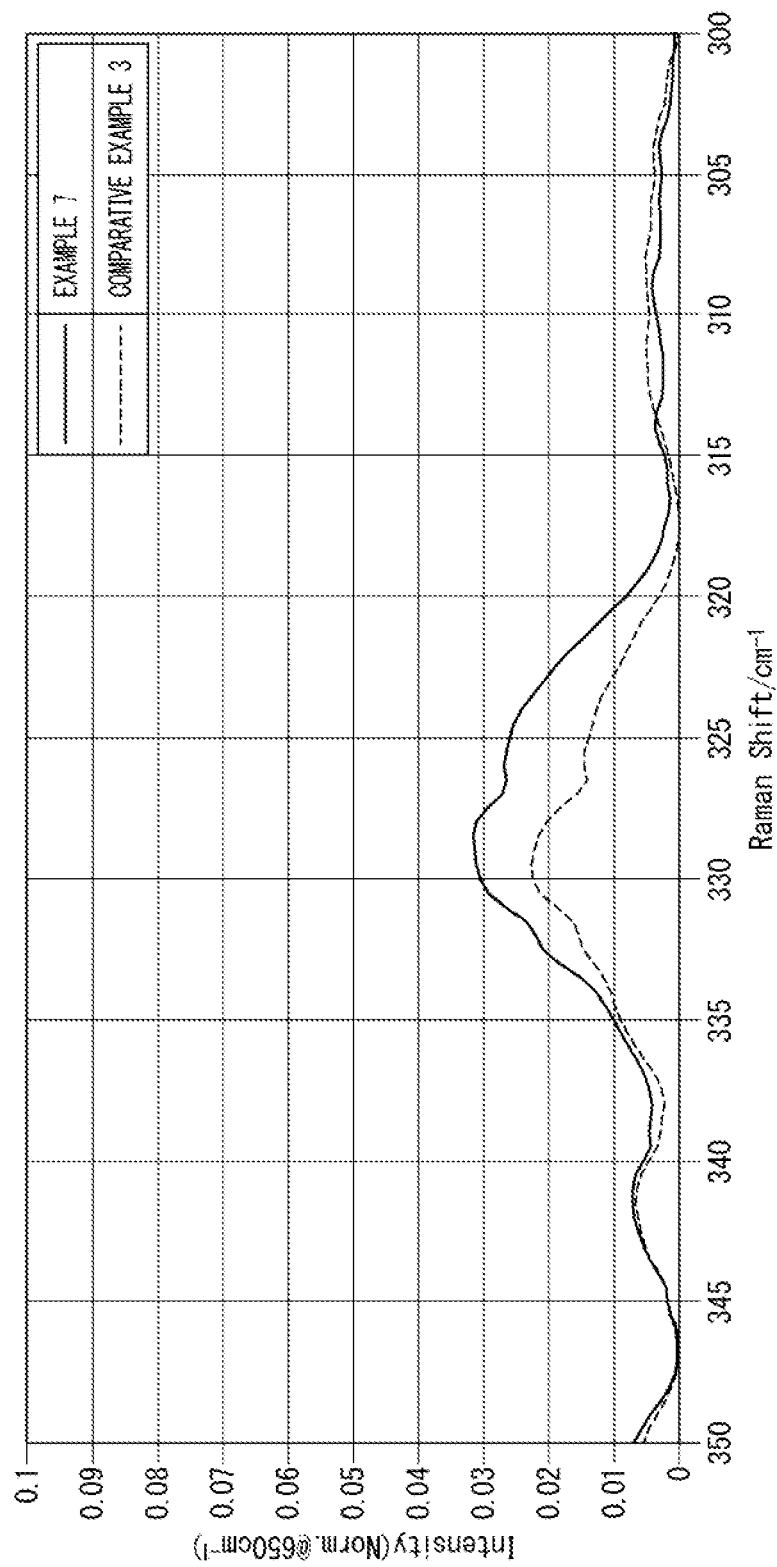
FIG. 7 is an enlarged diagram of the Raman spectra at a Raman shift of 300 cm$^{-1}$ to 350 cm$^{-1}$ in FIG. 5.

As a representative, FIG. 5 shows the Raman spectra obtained in Example 7 and Comparative Example 3, FIG. 6 is an enlarged diagram at a Raman shift of 700 cm$^{-1}$ to 750 cm$^{-1}$, and FIG. 7 is an enlarged diagram at a Raman shift of 300 cm$^{-1}$ to 350 cm$^{-1}$. As shown in FIG. 5 to FIG. 7, the pigment for a color filter in Example 7 shows, near a Raman shift of 713 cm$^{-1}$, a relative intensity of as high as about 1.9 times the relative intensity near a Raman shift of 713 cm$^{-1}$ in Comparative Example 3 when the peak intensity at a Raman shift of 650±10 cm$^{-1}$ is regarded as 100%. Also, the pigment for a color filter in Example 7 shows, near a Raman shift of 323 cm$^{-1}$, a relative intensity of as high as about 1.4 times the relative intensity near a Raman shift of 328 cm$^{-1}$ in Comparative Example 3.

<Production of Pigment for Color Filter>

Production Example 13: Production of Green Pigment G17

In a 1-L autoclave, 75 g of the water-containing crude pigment WC1 was charged together with 525 g of water. The hydrogen ion index was adjusted to pH 5.5 by using hydrochloric acid at a concentration of 5%, and then the autoclave was closed. The crude pigment was heated to 110° C. over 2 hours under stirring and held at 110° C. for 5 hours. When the temperature reached 110° C., the pressure in the autoclave was 0.14 MPa. After allowing to cool to room temperature, filtration, hot-water washing, drying, and grinding were performed to produce a green pigment G17.

The green pigment G17 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 23 nm. In addition, the arithmetic standard deviation of a particle size distribution was calculated by the method and conditions described above using a dynamic light scattering particle size distribution analyzer. The arithmetic standard deviation of the particle size distribution was 17 nm.

Production Example 14: Production of Green Pigment G18

In a 1-L autoclave, 75 g of the water-containing crude pigment WC1 was charged together with 525 g of water. The hydrogen ion index was adjusted to pH 5.5 by using hydrochloric acid at a concentration of 5%, and then the autoclave was closed. The crude pigment was heated to 150° C. over 2 hours under stirring and held at 150° C. for 5 hours. When the temperature reached 150° C., the pressure in the autoclave was 0.48 MPa. After allowing to cool to room temperature, filtration, hot-water washing, drying, and grinding were performed to produce a green pigment G18.

The green pigment G18 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 28 nm. In addition, the arithmetic standard deviation of a particle size distribution was calculated by the method and conditions described above using a dynamic light scattering particle size distribution analyzer. The arithmetic standard deviation of the particle size distribution was 17 nm.

Production Example 15: Production of Green Pigment G19

In a 1-L autoclave, 75 g of the water-containing crude pigment WC1 was charged together with 525 g of water. The hydrogen ion index was adjusted to pH 5.5 by using hydrochloric acid at a concentration of 5%, and then the autoclave was closed. The crude pigment was heated to 50° C. over 2 hours under stirring and held at 50° C. for 5 hours. When the temperature reached 50° C., the pressure in the autoclave was 0.02 MPa. After allowing to cool to room temperature, filtration, hot-water washing, drying, and grinding were performed to produce a green pigment G19.

The green pigment G19 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 19 nm. In addition, the arithmetic standard deviation of a particle size distribution was calculated by the method and conditions described above using a dynamic light scattering particle size distribution analyzer. The arithmetic standard deviation of the particle size distribution was 16 nm.

Production Example 16: Production of Green Pigment G20

In a 1-L autoclave, 75 g of the water-containing crude pigment WC1 was charged together with 525 g of water. The hydrogen ion index was adjusted to pH 5.5 by using hydrochloric acid at a concentration of 5%, and then the autoclave was closed. The crude pigment was heated to 180° C. over 2 hours under stirring and held at 180° C. for 5 hours. When the temperature reached 180° C., the pressure in the autoclave was 1.00 MPa. After allowing to cool to room temperature, filtration, hot-water washing, drying, and grinding were performed to produce a green pigment G20.

The green pigment G20 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 31 nm. In addition, the arithmetic standard deviation of a particle size distribution was calculated by the method and conditions described above using a dynamic light scattering particle size distribution analyzer. The arithmetic standard deviation of the particle size distribution was 15 nm.

Reference Production Example: Production of Green Pigment G21

In a 1-L autoclave, 30 g of the crude green pigment C1 was charged together with 570 g of ethanol, and then the autoclave was closed. The crude pigment was heated to 120° C. over 2 hours under stirring and held at 120° C. for 5 hours. When the temperature reached 120° C., the pressure in the autoclave was 0.41 MPa. After allowing to cool to room temperature, filtration, hot-water washing, drying, and grinding were performed to produce a green pigment G21.

The green pigment G21 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 41 nm. In addition, the arithmetic standard deviation of a particle size distribution was calculated by the method and conditions described above using a dynamic light scattering particle size distribution analyzer. The arithmetic standard deviation of the particle size distribution was 14 nm.

<Production of Color Filter>

Example 13

A pigment dispersion for a color filter (MG17) and a composition for evaluation (CG17) were produced by the same method as in Example 1 except that the green pigment G1 in Example 1 was changed to the green pigment G17 produced in Production Example 13.

Example 14

A pigment dispersion for a color filter (MG18) and a composition for evaluation (CG13) were produced by the same method as in Example 1 except that the green pigment G1 in Example 1 was changed to the green pigment G18 produced in Production Example 14.

Example 15

A pigment dispersion for a color filter (MG19) and a composition for evaluation (CG19) were produced by the same method as in Example 1 except that the green pigment G1 in Example 1 was changed to the green pigment G19 produced in Production Example 15.

Example 16

A pigment dispersion for a color filter (MG20) and a composition for evaluation (CG20) were produced by the same method as in Example 1 except that the green pigment G1 in Example 1 was changed to the green pigment G20 produced in Production Example 16.

Reference Example

A pigment dispersion for a color filter (MG21) and a composition for evaluation (CG21) were produced by the same method as in Example 1 except that the green pigment G1 in Example 1 was changed to the green pigment G21 produced in Reference Production Example.

<Luminance Measurement>

The luminance of each of the compositions for evaluation (CG17 to CG21) prepared in Examples 13 to 16 and the reference example was measured by the same method as in Example 1.

Table 5 shows the results of luminance evaluation of Examples 13 to 16 and the reference example. In Table 5, the luminance is shown as a relative value when the value of luminance of the composition for evaluation (CG3) of Comparative Example 1 is regarded as 100%.

TABLE 5

| | Crude pigment | Green pigment | Heating temperature | Gauge pressure [MPa] | Luminance |
|---|---|---|---|---|---|
| Example 13 | WC1 | G17 | 110° C | 0.14 | 105.1% |
| Example 14 | WC1 | G18 | 150° C. | 0.48 | 104.8% |
| Example 15 | WC1 | G19 | 50° C. | 0.02 | 104.4% |
| Example 16 | WC1 | G20 | 180° C. | 1.00 | 104.4% |
| Reference Example | C1 | G21 | 120° C. (In ethanol) | 0.41 | 101.6% |

Table 5 indicates that color filters formed in Examples 13 to 16 by using the green pigments G17 to G20, formed at different heating temperatures from 130° C. in Example 1 during pigment formation, have high luminance like in Example 1. The green pigment G21 used in the reference example was produced by heating in ethanol, not in water. The luminance in the reference example is lower than in Examples 13 to 16.

Measurement of Raman Spectrum>

The Raman spectrum of each of the green pigments (G17 to G21) formed in Examples 13 to 16 and the reference example was measured by the same method as in Example 1. The results are shown in Table 6.

TABLE 6

| | Relative intensity when peak intensity at 650 cm$^{-1}$ is regarded as 100% | | |
|---|---|---|---|
| | 321 cm$^{-1}$ | 328 cm$^{-1}$ | 716 cm$^{-1}$ |
| Example 13 | 9.7% | 6.3% | 5.6% |
| Example 14 | 9.8% | 6.0% | 5.4% |
| Example 15 | 9.7% | 6.2% | 5.9% |
| Example 16 | 10.0% | 5.8% | 5.1% |
| Reference Example | 15.0% | 3.9% | 2.8% |

The results of Table 6 indicate that any one of the pigments for a color filter formed in Examples 13 to 16 by using the green pigments G17 to G20, formed at different heating temperatures from 130° C. in Example 1 during pigment formation, shows a relative intensity of 5.1% near a Raman shift of 716 cm$^{-1}$ when the peak intensity at a Raman shift of 650±10 cm$^{-1}$ is regarded as 100%.

On the other hand, the pigment for a color filter formed in the reference example using the green pigment G21 formed by heating in ethanol shows a relative intensity of 2.8% near a Raman shift of 716 cm$^{-1}$ and thus shows lower relative intensity than Examples 13 to 16.

Also, any one of the pigments for a color filter in Examples 13 to 16 shows a relative intensity of 5.8% or more at a Raman shift of 328 cm$^{-2}$. On the other hand, the pigment for a color filter in the reference example shows a relative intensity of 3.9% at a Raman shift of 328 cm$^{-1}$ and thus shows lower relative intensity than Examples 13 to 16.

Further, any one of the pigments for a color filter in Examples 13 to 16 shows a relative intensity of 10.0% or less near a Raman shift of 321 cm$^{-1}$. On the other hand, the pigment for a color filter in the reference example shows a relative intensity of 15.0% near a Raman shift of 321 cm$^{-1}$ and thus shows higher relative intensity than Examples 13 to 16.

<Production of Pigment for Color Filter>

Production Example 17: Production of Green Pigment G22

In a 1-L autoclave, 100 g of the water-containing crude pigment WC2 was charged together with 500 g of water. The hydrogen ion index was adjusted to pH 5.5 by using hydrochloric acid at a concentration of 5%, and then the autoclave was closed. The crude pigment was heated to 110° C. over 2 hours under stirring and held at 110*C for 5 hours. When the temperature reached 110° C., the pressure in the autoclave was 0.14 MPa. After allowing to cool to room temperature, filtration, hot-water washing, drying, and grinding were performed to produce a green pigment G22.

The green pigment G22 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 26 ran. In addition, the arithmetic standard deviation of a particle size distribution was calculated by the method and conditions described above using a dynamic light scattering particle size distribution analyzer. The arithmetic standard deviation of the particle size distribution was 13 nm.

Production Example 18: Production of Green Pigment G23

In a 1-L autoclave, 100 g of the water-containing crude pigment WC2 was charged together with 500 g of water. The hydrogen ion index was adjusted to pH 5.5 by using hydrochloric acid at a concentration of 5%, and then the autoclave was closed. The crude pigment was heated to 150° C. over 2 hours under stirring and held at 150° C. for 5 hours. When the temperature reached 150° C., the pressure in the autoclave was 0.48 MPa. After allowing to cool to room temperature, filtration, hot-water washing, drying, and grinding were performed to produce a green pigment G23.

The green pigment G23 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 27 ran. In addition, the arithmetic standard deviation of a particle size distribution was calculated by the method and conditions described above using a dynamic light scattering particle size distribution analyzer. The arithmetic standard deviation of the particle size distribution was 21 nm.

Production Example 19: Production of Green Pigment G24

In a 1-L autoclave, 100 g of the water-containing crude pigment WC2 was charged together with 500 g of water. The hydrogen ion index was adjusted to pH 5.5 by using hydrochloric acid at a concentration of 5%, and then the autoclave was closed. The crude pigment was heated to 50° C. over 2 hours under stirring and held at 50° C. for 5 hours. When the temperature reached 50° C., the pressure in the autoclave was 0.02 MPa. After allowing to cool to room temperature, filtration, hot-water washing, drying, and grinding were performed to produce a green pigment G24.

The green pigment G24 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 25 nm. In addition, the arithmetic standard deviation of a particle size distribution was calculated by the method and conditions described above using a dynamic light scattering particle size distribution analyzer. The arithmetic standard deviation of the particle size distribution was 21 nm.

Production Example 20: Production of Green Pigment G25

In a 1-L autoclave, 100 g of the water-containing crude pigment WC2 was charged together with 500 g of water. The hydrogen ion index was adjusted to pH 5.5 by using hydrochloric acid at a concentration of 5%, and then the autoclave was closed. The crude pigment was heated to 180° C. over 2 hours under stirring and held at 180° C. for 5 hours. When the temperature reached 180° C., the pressure in the autoclave was 1.00 MPa. After allowing to cool to room temperature, filtration, hot-water washing, drying, and grinding were performed to produce a green pigment G25.

The green pigment G25 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 29 nm. In addition, the arithmetic standard deviation of a particle size distribution was calculated by the method and conditions described above using a dynamic light scattering particle size distribution analyzer. The arithmetic standard deviation of the particle size distribution was 19 nm.

Comparative Production Example 5: Production of Green Pigment G26

In a 1-L autoclave, 30 g of the crude pigment C2 was charged together with 570 g of ethanol, and then the autoclave was closed. The crude pigment was heated to 120° C. over 2 hours under stirring and held at 120° C. for 5 hours. When the temperature reached 120° C., the pressure in the autoclave was 0.41 MPa. After allowing to cool to room temperature, filtration, hot-water washing, drying, and grinding were performed to produce a green pigment G26.

The green pigment G26 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 100 run. In addition, the arithmetic standard deviation of a particle size distribution was calculated by the method and conditions described above using a dynamic light scattering particle size distribution analyzer. The arithmetic standard deviation of the particle size distribution was 18 nm.

<Production of Color Filter>

Example 17

A pigment dispersion for a color filter (MG22) and a composition for evaluation (CG22) were produced by the same method as in Example 7 except that the green pigment G2 in Example 7 was changed to the green pigment G22 produced in Production Example 17.

Example 18

A pigment dispersion for a color filter (MG23) and a composition for evaluation (CG23) were produced by the same method as in Example 7 except that the green pigment G2 in Example 7 was changed to the green pigment G23 produced in Production Example 18.

Example 19

A pigment dispersion for a color filter (MG24) and a composition for evaluation (CG24) were produced by the same method as in Example 7 except that the green pigment G2 in Example 7 was changed to the green pigment G24 produced in Production Example 15.

Example 20

A pigment dispersion for a color filter (MG25) and a composition for evaluation (CG25) were produced by the same method as in Example 7 except that the green pigment G2 in Example 7 was changed to the green pigment G25 produced in Production Example 20.

Comparative Example 5

A pigment dispersion for a color filter (MG26) and a composition for evaluation (CG26) were produced by the same method as in Example 7 except that the green pigment G2 in Example 7 was changed to the green pigment G26 produced in Comparative Production Example 5.

<Luminance Measurement>

The luminance of each of the compositions for evaluation (CG22 to CG26) prepared in Examples 17 to 20 and Comparative Example 5 was measured by the same method as in Example 7.

Table 7 shows the results of luminance evaluation of Examples 17 to 20 and Comparative Example 5. In Table 7, the luminance is shown as a relative value when the value of luminance of the composition for evaluation (CG4) of Comparative Example 3 is regarded as 100%.

TABLE 7

|  | Crude pigment | Green pigment | Heating temperature | Gauge pressure [MPa] | Luminance |
|---|---|---|---|---|---|
| Example 17 | WC2 | G22 | 110° C. | 0.14 | 101.4% |
| Example 18 | WC2 | G23 | 150° C. | 0.48 | 102.4% |
| Example 19 | WC2 | G24 | 50° C. | 0.02 | 101.4% |
| Example 20 | WC2 | G25 | 180° C. | 1.00 | 102.6% |
| Comparative Example 5 | C2 | G26 | 120° C. | 0.41 | 99.3% |

Table 7 indicates that color filters formed in Examples 17 to 20 using the green pigments G17 to G20 formed at different heating temperatures from 130° C. in Example 7 during pigment formation have high luminance like in Example 7. In Comparative Example 5, the green pigment G26 used in Comparative Example 5 was produced by heating in ethanol, not in water. The luminance in Comparative Example 5 is lower than in Examples 17 to 20.

<Measurement of Raman Spectrum>

The Raman spectrum of each of the green pigments (G22 to G26) formed in Examples 17 to 20 and Comparative Example 5 was measured by the same method as in Example 7. The results are shown in Table 8.

TABLE 8

| | Relative intensity when peak intensity at 650 cm$^{-1}$ is regarded as 100% | |
|---|---|---|
| | 328 cm$^{-1}$ | 713 cm$^{-1}$ |
| Example 17 | 3.2% | 2.1% |
| Example 18 | 3.3% | 2.0% |
| Example 19 | 3.0% | 2.0% |
| Example 20 | 3.2% | 1.9% |
| Comparative Example 5 | 2.0% | 0.9% |

The results of Table 8 indicate that any one of the pigments for a color filter formed in Examples 17 to 20 using the green pigments G17 to G20, formed at different heating temperatures from 130° C. in Example 7 during pigment formation, shows a relative intensity of 1.9% near a Raman shift of 713 cm$^{-1}$ when the peak intensity at a Raman shift of 650±10 cm$^{-1}$ is regarded as 100%.

On the other hand, the pigment for a color filter formed in Comparative Example 5 using the green pigment G26 formed by heating in ethanol shows a relative intensity of 0.9% near a Raman shift of 713 cm$^{-1}$ and thus shows lower relative intensity than in Examples 17 to 20.

Also, any one of the pigments for a color filter in Examples 17 to 20 shows a relative intensity of 3.0% or more near a Raman shift of 328 cm$^{-1}$. On the other hand, the pigment for a color filter in Comparative Example 5 shows a relative intensity of 2.0% near a Raman shift of 328 cm$^{-1}$ and thus shows lower relative intensity than Examples 17 to 20.

Described below are comparative examples when a copper halide phthalocyanine crude pigment was formed as a reference.

<Synthesis of Water-Containing Crude Pigment>

Comparative Synthesis Example 1

In a 300-ml flask, 91 g of sulfuryl chloride (Fujifilm Wako Pure Chemical's reagent), 109 g of aluminum chloride (Kanto Chemical's reagent), 15 g of sodium chloride (Tokyo Chemical Industry's reagent), 30 g of copper phthalocyanine manufactured by DIC Corporation, and 230 g of bromine (Fujifilm Wako Pure Chemical's reagent) were charged. Then, the resultant mixture was heated to 130° C. and taken out and placed in water and then filtered, and then the residue was washed with water to produce a water-containing crude pigment WC3 which was a copper halide phthalocyanine crude pigment. Then, 10 g of the water-containing crude pigment WC3 was dried at 90° C. for 14 hours to produce 4 g of a crude pigment C3.

Mass spectrometry by JMS-S3000 manufactured by JEOL, Ltd. confirmed that the crude pigment C3 is copper halide phthalocyanine having an average chlorine number of 2.6 and an average bromine number of 13.0. In addition, in mass spectrometry, the delay time was 275 ns, the laser intensity was 34%, and the resolving power value of the peak at m/z=1820 or more and 1860 or less was 42805.

<Production of Green Pigment>

Comparative Production Example 6

In a 1-L autoclave, 75 g of the water-containing crude pigment WC3 was charged together with 525 g of water. The hydrogen ion index was adjusted to pH 5.5 by using hydrochloric acid at a concentration of 5%, and then the autoclave was closed. The crude pigment was heated to 130° C. over 2 hours under stirring and held at 130° C. for 5 hours. When the temperature reached 130° C., the pressure in the autoclave was 0.25 MPa. After allowing to cool to room temperature, filtration, hot-water washing, drying, and grinding were performed to produce a green pigment G27.

The green pigment G27 was ultrasonically dispersed in cyclohexane and then photographed by a microscope, and the average particle diameter of primary particles was calculated from the average value of 40 of the primary particles constituting an aggregate in a two-dimensional image. The average particle diameter of the primary particles was 25 nm. In addition, the arithmetic standard deviation of a particle size distribution was calculated by the method and conditions described above using a dynamic light scattering particle size distribution analyzer. The arithmetic standard deviation of the particle size distribution was 27 nm.

<Production of Color Filter>

Comparative Example 6

An attempt was made to prepare a pigment dispersion for a color filter and a composition for evaluation by the same method as in Example 1 by using the green pigment G27 produced in Comparative Production Example 6. However, in preparing the composition for evaluation, solidification occurred due to dispersion failure, and thus a colored film on a glass substrate for luminance evaluation could not be formed.

INDUSTRIAL APPLICABILITY

According to embodiments of the present invention, a green color filter having excellent contrast and high luminance can be formed by a halogenated zinc phthalocyanine pigment for a color filter, a pigment dispersion for a color filter, a curable composition for a color filter green pixel portion, a method for producing a halogenated zinc phthalocyanine pigment for a color filter, a method for producing a pigment dispersion for a color filter, and a method for producing a color filter.

The invention claimed is:

1. A halogenated zinc phthalocyanine pigment for a color filter, wherein in a Raman spectrum, a peak intensity at $716\pm2.2$ $cm^{-1}$ is 3.0% or more when a peak intensity at $650\pm10$ $cm^{-1}$ is regarded as 100%.

2. The halogenated zinc phthalocyanine pigment for a color filter according to claim 1, wherein an intensity at 328 $cm^{-1}$ is 4.5% or more when a peak intensity at $650\pm10$ $cm^{-1}$ is regarded as 100%.

3. The halogenated zinc phthalocyanine pigment for a color filter according to claim 1, wherein a peak intensity at $321\pm2.2$ $cm^{-1}$ is 12.5% or less when a peak intensity at $650\pm10$ $cm^{-1}$ is regarded as 100%.

4. A halogenated zinc phthalocyanine pigment for a color filter, wherein in a Raman spectrum, a peak intensity at $713\pm2.2$ $cm^{-1}$ is 15% or more when a peak intensity at $650\pm10$ $cm^{-1}$ is regarded as 100%.

5. The halogenated zinc phthalocyanine pigment for a color filter according to claim 4, wherein a peak intensity at $328\pm2.2$ $cm^{-1}$ is 2.5% or more when a peak intensity at $650\pm10$ $cm^{-1}$ is regarded as 100%.

6. A pigment dispersion for a color filter comprising the halogenated zinc phthalocyanine pigment for a color filter according to claim 1 and a dispersant.

7. A curable composition for a color filter green pixel portion, comprising the pig dispersion for a color filter according to claim 6 and a curable resin.

8. A method for producing a halogenated zinc phthalocyanine pigment for a color filter, comprising heating a halogenated zinc phthalocyanine crude pigment under pressure in water to form a pigment.

9. The method for producing a halogenated zinc phthalocyanine pigment for a color filter according to claim 8, wherein the primary particles of the halogenated zinc phthalocyanine pigment for a color filter have an average particle diameter of 10 nm to 40 nm.

10. The method for producing a halogenated zinc phthalocyanine pigment for a color filter according to claim 8, wherein the heating temperature is 100° C. to 160° C.

11. A method for producing a pigment dispersion for a color filter, comprising mixing a pigment for a color filter produced by the method according to claim 8 with a dispersant.

12. A method for producing a color filter comprising preparing a curable composition for a color filter green pixel portion by mixing a pigment dispersion for a color filter produced by the method according to claim 11 with a curable resin, and applying the curable composition for a color filter green pixel portion on a transparent substrate.

* * * * *